(12) United States Patent
Hong et al.

(10) Patent No.: US 11,567,601 B2
(45) Date of Patent: Jan. 31, 2023

(54) FORCE SENSOR AND DISPLAY DEVICE INCLUDING THE SAME

(71) Applicant: SAMSUNG DISPLAY CO., LTD., Yongin-si (KR)

(72) Inventors: Won Ki Hong, Suwon-si (KR); Sung Kook Park, Suwon-si (KR); So Hee Park, Cheonan-si (KR); Hee Seomoon, Hwaseong-si (KR); Young Seok Seo, Seoul (KR); Tae Hee Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/494,021

(22) Filed: Oct. 5, 2021

(65) Prior Publication Data
US 2022/0027007 A1   Jan. 27, 2022

Related U.S. Application Data

(63) Continuation of application No. 16/569,399, filed on Sep. 12, 2019, now Pat. No. 11,137,850.

(30) Foreign Application Priority Data

Nov. 16, 2018   (KR) ........................ 10-2018-0141647

(51) Int. Cl.
*G06F 3/041*   (2006.01)
*G01L 1/14*    (2006.01)
*G01L 1/26*    (2006.01)
*G06F 3/044*   (2006.01)
*G01L 1/20*    (2006.01)

(52) U.S. Cl.
CPC ............ *G06F 3/0414* (2013.01); *G01L 1/142* (2013.01); *G01L 1/26* (2013.01); *G06F 3/044* (2013.01); *G01L 1/20* (2013.01); *G06F 2203/04105* (2013.01)

(58) Field of Classification Search
CPC ......... G06F 3/0414; G06F 2203/04105; G01L 1/142; G01L 1/20
See application file for complete search history.

(56) References Cited

U.S. PATENT DOCUMENTS

| 7,538,760 | B2 | 5/2009 | Hotelling et al. |
| 8,654,524 | B2 | 2/2014 | Pance et al. |
| 8,686,952 | B2 | 4/2014 | Burrough et al. |
| 8,787,006 | B2 | 7/2014 | Golko et al. |

(Continued)

FOREIGN PATENT DOCUMENTS

KR   10-2017-0129372   11/2017

*Primary Examiner* — Michael Pervan
(74) *Attorney, Agent, or Firm* — F. Chau & Associates, LLC

(57) ABSTRACT

A force sensor includes first and second substrates. The second substrate faces the first substrate. A driving electrode is disposed on a first surface of the first substrate facing the second substrate. A sensing electrode is disposed on the first surface of the first substrate and is spaced apart from the driving electrode. A force sensitive layer is disposed on a first surface of the second substrate, facing the first substrate. The driving electrode includes a main driving protrusion that protrudes from a side surface of the driving electrode, facing the sensing electrode.

21 Claims, 28 Drawing Sheets

(56) References Cited

U.S. PATENT DOCUMENTS

| | | | |
|---|---|---|---|
| 9,195,343 | B1 | 11/2015 | Zarraga et al. |
| 9,696,223 | B2 | 7/2017 | Usseman et al. |
| 10,139,974 | B2 | 11/2018 | Hong et al. |
| 2014/0028575 | A1 | 1/2014 | Parivar et al. |
| 2014/0085213 | A1 | 3/2014 | Huppi et al. |
| 2014/0091857 | A1 | 4/2014 | Bernstein |
| 2014/0092064 | A1 | 4/2014 | Bernstein et al. |
| 2014/0210784 | A1* | 7/2014 | Gourevitch ............ G06F 3/0443 345/174 |
| 2014/0253498 | A1* | 9/2014 | Suzuki .................. G06F 3/0445 345/174 |
| 2014/0293145 | A1 | 10/2014 | Jones et al. |
| 2017/0357344 | A1 | 12/2017 | Hong et al. |
| 2020/0159358 | A1 | 5/2020 | Hong et al. |

\* cited by examiner

FIG. 6
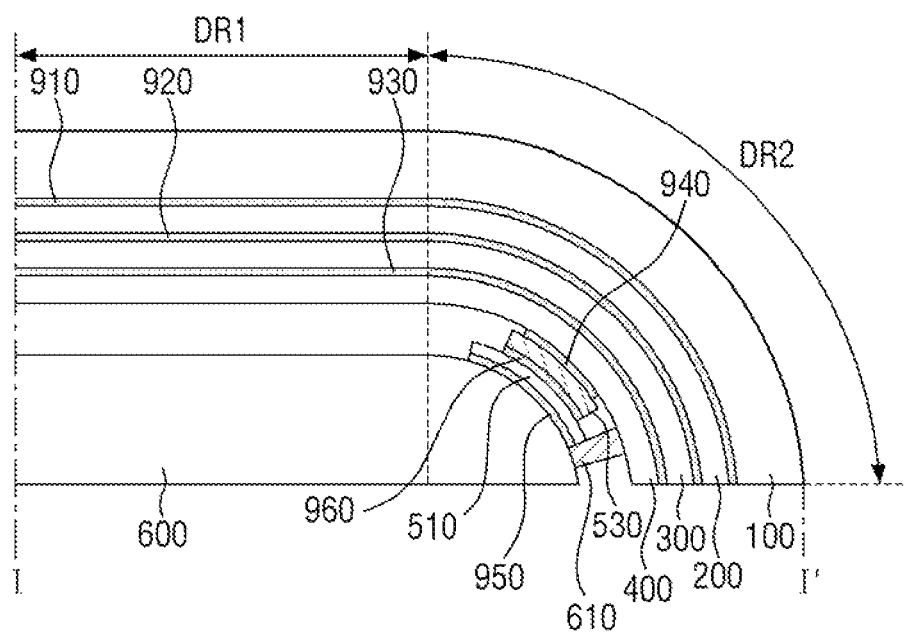
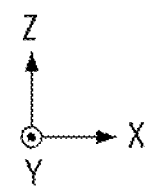

FIG. 20
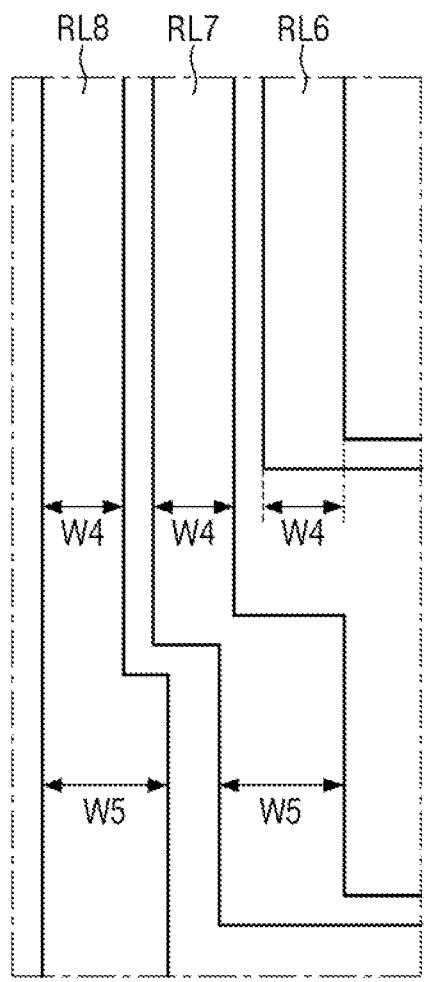
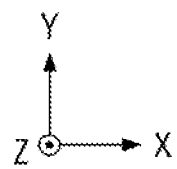

FORCE SENSOR AND DISPLAY DEVICE INCLUDING THE SAME

CROSS-REFERENCE TO RELATED APPLICATION

This application is a Continuation of co-pending U.S. patent application Ser. No. 16/569,399, filed on Sep. 12, 2019, which claims priority under 35 U.S.C. § 119 to Korean Patent Application No. 10-2018-0141647 filed on Nov. 16, 2018 in the Korean Intellectual Property Office, the contents of which are herein incorporated by reference in their entirety.

TECHNICAL FIELD

The present disclosure relates to a force sensor and, more specifically, to a force sensor and a display device including the same.

DISCUSSION OF THE RELATED ART

Electronic devices such as a smart phone, a tablet PC, a digital camera, a laptop computer, a navigation system, and a smart television, generally include a display device for displaying an image. The display device generally includes a display panel for generating and displaying an image and various input devices, such as a touch-sensitive panel.

Display devices that have touch-sensitivity are generally referred to as a touchscreen. Touchscreens have become widely adopted in smart phones and tablet computers. Due to the convenience of touch operations, there is a tendency to replace a key pad, which is a conventional physical input device, with an on-screen keypad displayed on a touchscreen. While conventional touchscreens and other touch-sensitive devices may be able to sense a position of a touch event, force sensors have also been used to sense a pressure of a press that has been applied thereto.

SUMMARY

A force sensor includes first and second substrates. The second substrate faces the first substrate. A driving electrode is disposed on a first surface of the first substrate facing the second substrate. A sensing electrode is disposed on the first surface of the first substrate and is spaced apart from the driving electrode. A force sensitive layer is disposed on a first surface of the second substrate, facing the first substrate. The driving electrode includes a main driving protrusion that protrudes from a side surface of the driving electrode, facing the sensing electrode.

A force sensor includes a first substrate and a second substrate facing the first substrate. A plurality of force sensitive cells is arranged between the first substrate and the second substrate. Each of the plurality of force sensitive cells includes a driving electrode, a sensing electrode, and a force sensitive layer at least partially overlapping both the driving electrode and the sensing electrode. The driving electrode and/or the sensing electrode includes a protrusion protruding from one side surface of the driving electrode, the one side surface facing either the sensing electrode or the driving electrode.

A display device includes a display panel and a force sensor disposed below the display panel. The force sensor includes a first substrate, a second substrate facing the first substrate, a driving electrode disposed on one surface of the first substrate, facing the second substrate, a sensing electrode disposed on the one surface of the first substrate and spaced apart from the driving electrode, and a three sensitive layer disposed on one surface of the second substrate, facing the first substrate. The driving electrode includes a driving protrusion protruding from one side surface of the driving electrode, facing the sensing electrode.

BRIEF DESCRIPTION OF THE DRAWINGS

The above and other aspects and features of the present disclosure will become more apparent by describing in detail exemplary embodiments thereof with reference to the attached drawings, in which:

FIG. 6 is a cross-sectional view taken along line I-I' of FIG. 3;

FIG. 20 is an enlarged plan view illustrating an example of region C of FIG. 9;

DETAILED DESCRIPTION OF THE EXEMPLARY EMBODIMENTS

The present invention will now be described more fully hereinafter with reference to the accompanying drawings, in which exemplary embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The same reference numbers may indicate the same components throughout the specification and the drawings. In the attached figures, the thickness and shapes of the various layers and regions may be exaggerated for clarity. However, it is to be understood that the exact structure shown is believed to be an exemplary embodiment of the present invention and so relative sizes, various angles, and structural arrangements shown in the figures may be taken as a particular exemplary embodiment.

It will also be understood that when a layer is referred to as being "on" another layer or substrate, it can be directly on the other layer or substrate, or intervening layers may also be present.

Hereinafter, exemplary embodiments of the present inventive concept will be described with reference to the accompanying drawings.

Figure 1:
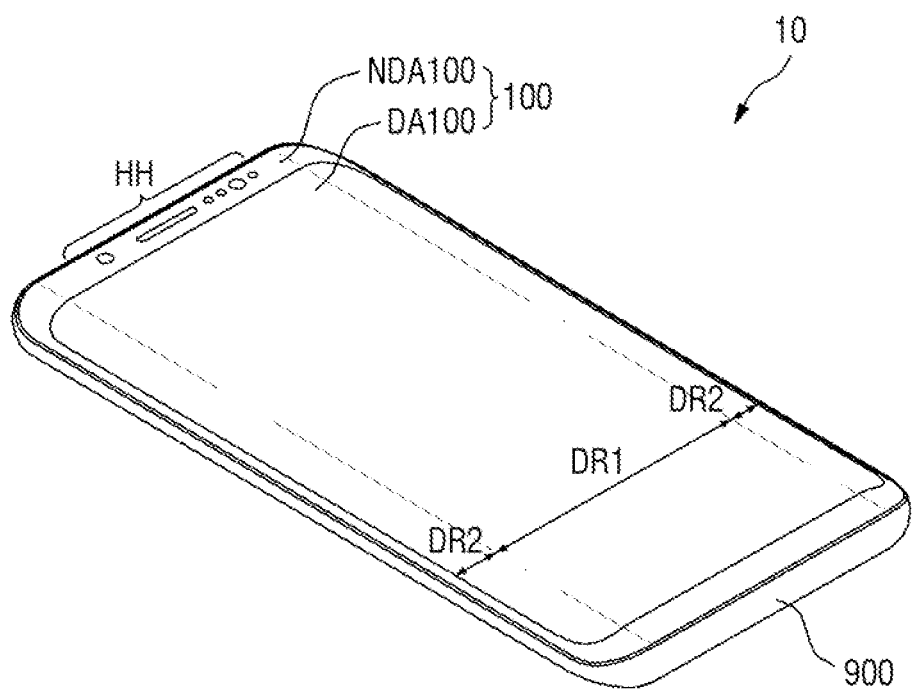
FIG. 1 is a perspective view illustrating a display device according to an exemplary embodiment of the present inventive concept.
Figure 2:
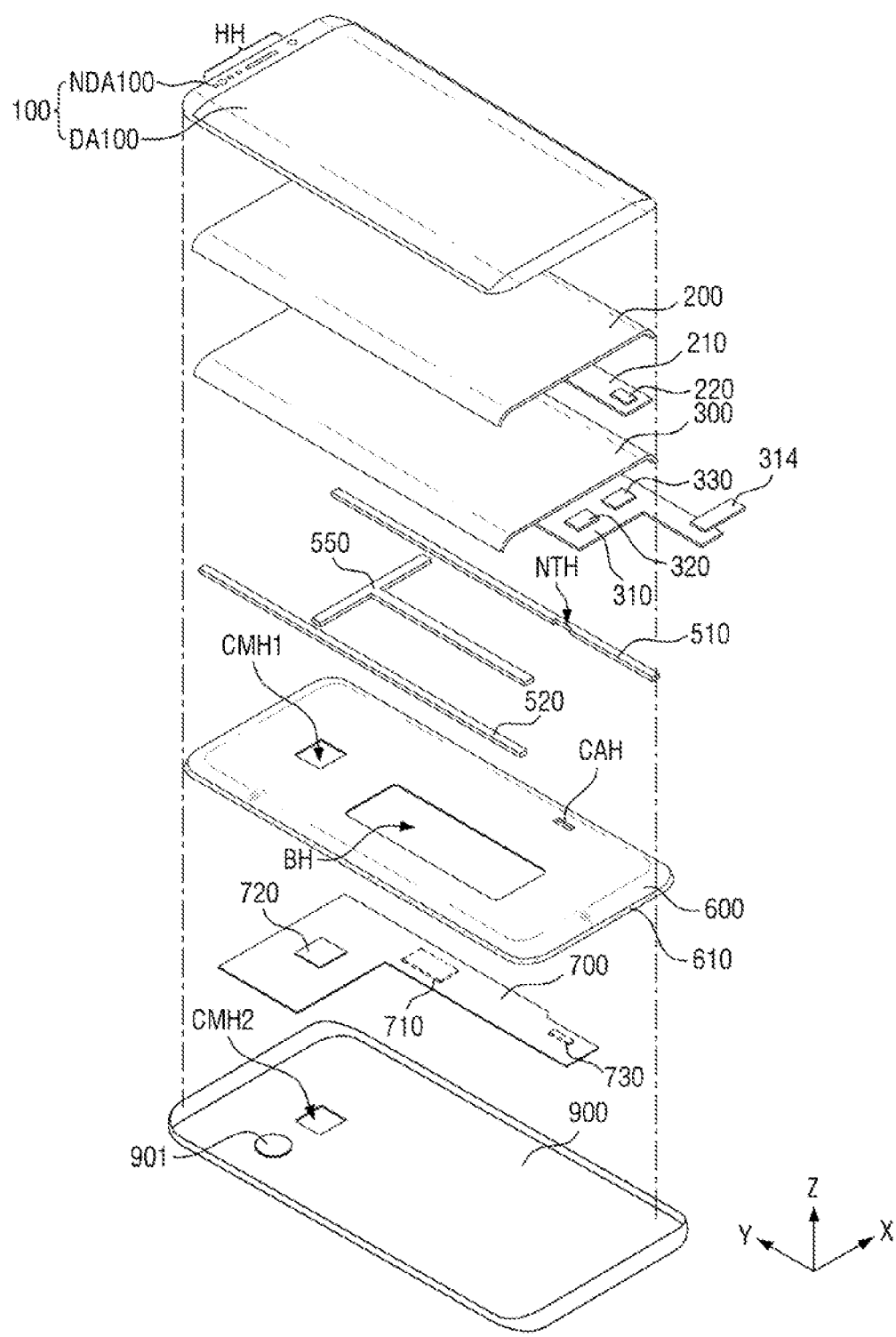
FIG. 2 is an exploded perspective view illustrating a display device according to an exemplary embodiment of the present inventive concept.

FIG. 1 is a perspective view illustrating a display device according to an exemplary embodiment of the present inventive concept. FIG. 2 is an exploded perspective view of a display device according to an exemplary embodiment of the present inventive concept.

Referring to FIGS. 1 and 2, a display device 10, according to an exemplary embodiment of the present inventive concept, includes a cover window 100, a touch sensing device 200, a touch circuit board 210, a touch driver 220, a display panel 300, a display circuit board 310, a display driver 320, a force sensing unit 330, a first force sensor 510, a second force sensor 520, a force sensing circuit board 550, a lower frame 600, a main circuit board 700, and a lower cover 900.

The terms "above," "top," and "upper surface," as used herein, refer to a direction (i.e., a Z-axis direction) in which the window 100 is disposed with respect to the display panel 300. The terms "below," "bottom" and "lower surface," as used herein, refer to a direction (i.e., a direction opposite to the Z-axis direction) in which the lower frame 600 is disposed with respect to the display panel 300. Further, "left", "right", "upper," and "lower" indicate directions when the display panel 300 is viewed from the plane. For example, "left" refers to a direction opposite to an X-axis direction, "right" refers to the X-axis direction, "upper" refers to a Y-axis direction, and "lower" refers to a direction opposite to the Y-axis direction.

The display device 10 may have a rectangular shape, as may be seen in a plan view. For example, the display device 10 may have a rectangular planar shape having a pair of short sides extended in a first direction X-axis direction) and a pair of long sides extended in a second direction (Y-axis direction) as shown in FIGS. 1 and 2. The edges where the short sides of the first direction (X-axis direction) meet the long sides of the second direction (Y-axis direction) may be formed to be rounded so as to have a predetermined curvature or may alternatively be formed to have right angles. The planar shape of the display device 10 is not limited to a rectangular shape, but may be formed in another polygonal shape such as a circular shape or elliptical shape.

The display device 10 may include a first region DR1 that is substantially planar/un-curved and a pair of second regions DR2 extending from left and right sides of the first region DR1. The second region DR2 may be formed in a flat manner or in a curved manner. When the second region DR2 is formed in a flat manner, an angle between the first region DR1 and the second region DR2 may be an obtuse angle. When the second region DR2 is formed in a curved manner, it may have a constant curvature or a varying curvature.

Although it is illustrated in FIG. 1 that the second region DR2 extends from each of the left and right sides of the first region DR1, the present disclosure is not limited thereto. For example, the second region DR2 may extend only from either side of the right and left sides of the first region DR1. Alternatively, the second region DR2 may extend not only from the left and right sides of the first region DR1 but also from at least one of the upper and lower sides. The following description will be made in conjunction with a case where the second region DR2 is disposed at the left and right edges of the display device 10, as shown, but it is to be understood that the case shown may be modified in accordance with the above-described variations.

The cover window 100 may be disposed at the upper portion of the display panel 300 and may cover the upper surface of the display panel 300. Accordingly, the cover window 100 may function to protect the tipper surface of the display panel 300. The cover window 100 may be attached to the touch sensing device 200 via a first adhesive member 910, as shown in FIG. 6. The first adhesive member 910 may include an optically clear adhesive (OCA) or an optically clear resin (OCR).

The cover window 100 may include a transmissive (e.g. clear) portion DA100 corresponding to the display panel 300 and a light shielding (e.g. opaque) portion NDA100 corresponding to a region other than the display panel 300. Element 390 (FIG. 3) may represent a dividing line between the transmissive portion DA100 and the light shielding portion NDA100. The cover window 100 may be disposed in the first region DR1 and the second region DR2. The transmissive portion DA100 may be disposed in a portion of the first region DR1 and a portion of the second region DR2. The light shielding portion NDA100 may be formed as a decorative layer having a pattern that can be displayed to the user when an image is not displayed. For example, the company's logo such as "SAMSUNG" or various characters may be patterned in the light shielding portion NDA100. The light shield NDA100 may include holes HH for exposing a front camera, a front speaker, an infrared sensor, an iris recognition sensor, an ultrasonic sensor, an illuminance sensor and the like, but the present disclosure is not limited thereto. For example, some or all of the front camera, the front speaker, the infrared sensor, the iris recognition sensor, the ultrasonic sensor and the illuminance sensor may be incorporated in the display panel 300. In this case, some or all of the holes HH may be omitted. Alternatively, the transmissive portion DA100 may include the one or more holes HH, which may be shaped as a circle, a notch or some other shape of cutout, and in such cases, the light shielding portion NDA100 may be very narrow or omitted altogether.

The cover window 100 may be made of glass, sapphire, and/or plastic. The cover window 100 may be rigid or flexible. As used herein, a flexible or bendable panel is one that may be flexed and/or bent to a noticeable curvature without breaking.

The touch sensing device 200 may be disposed between the cover window 100 and the display panel 300. The touch sensing device 200 may be disposed in the first region DR1 and the second region DR2. Therefore, the user's touch can be detected, not only in the first region DR1, but also in the second region DR2.

The touch sensing device 200 may be attached to the lower surface of the cover window 100 through the first adhesive member 910 as shown in FIG. 6. A polarizing film may be added to the touch sensing device 200 to prevent a decrease in visibility due to reflection of external light. In this case, the polarizing film can be attached to the lower surface of the cover window 100 through the first adhesive member 910.

The touch sensing device 200 is configured for sensing an existence of and a position of a user's touch. The touch sensing device 200 may be implemented as a capacitive type such as a self-capacitance type or a mutual capacitance type. The touch sensing device 200 may include only touch driving electrodes when implemented as a self-capacitance type, whereas the touch sensing device 200 may include touch driving electrodes and touch sensing electrodes when implemented as a mutual capacitance type. Hereinafter, a case where the touch sensing device is implemented as a mutual capacitance type will be mainly described.

The touch sensing device 200 may be formed in a panel form or a film form. In this case, the touch sensing device 200 may be attached to a thin film sealing film of the display panel 300 through a second adhesive member 920, as shown in FIG. 6. The second adhesive member 920 may include an optically clear adhesive (OCA) or an optically clear resin (OCR).

Alternatively, the touch sensing device 200 may be formed integrally with the display panel 300. In this case, the touch driving electrodes and the touch sensing electrodes of the touch sensing device 200 may be formed on the thin film sealing film of the display panel 300.

Figure 3:
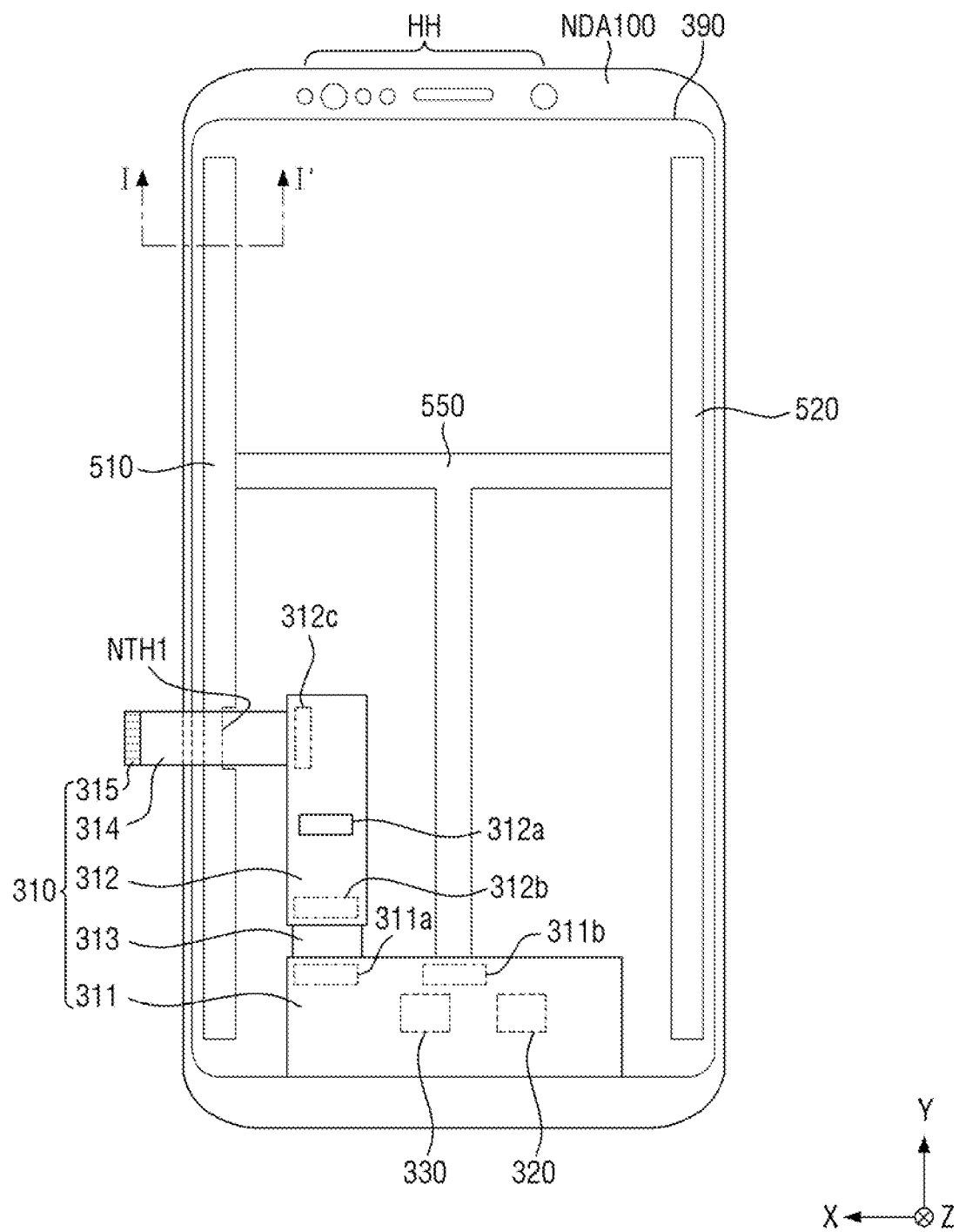
FIG. 3 is a bottom view illustrating an example of a display panel attached to a cover window of FIG. 2.

The touch circuit board 210 may be attached to one side of the touch sensing device 200. For example, one side of the touch circuit board 210 may be attached to the pads provided on one side of the touch sensing device 200 using an anisotropic conductive film. A touch connection unit may be provided on the other side of the touch circuit board 210 and the touch connection unit may be connected to a touch connector 312a of the display circuit board 310, as shown in FIG. 3. The touch circuit board may be a flexible printed circuit board.

The touch driver 220 may apply touch driving signals to the touch driving electrodes of the touch sensing device 200, may receive detection signals from the touch sensing electrodes of the touch sensing device 200, and may calculate the user's touch position by analyzing the detection signals. The touch driver 220 may be formed as an integrated circuit and may be mounted on the touch circuit board 210.

The display panel 300 may be disposed under the touch sensing device 200. The display panel 300 may at least partially overlap the transmissive portion DA100 of the cover window 100. The display panel 300 may be disposed in the first region DR1 and the second region DR2. Thus, the image of the display panel 300 can be seen, not only in the first region DR1, but also in the second region DR2.

The display panel 300 may be a light emitting display panel including a light emitting element. For example, the display panel 300 may include an organic light emitting display panel using an organic light emitting diode, an ultra-small light emitting diode display panel using a micro LED, and/or a quantum dot light emitting display panel including a quantum dot light emitting diode (OLED). Hereinafter, a case where the display panel 300 is an organic light emitting display panel will be mainly described.

Figure 7:
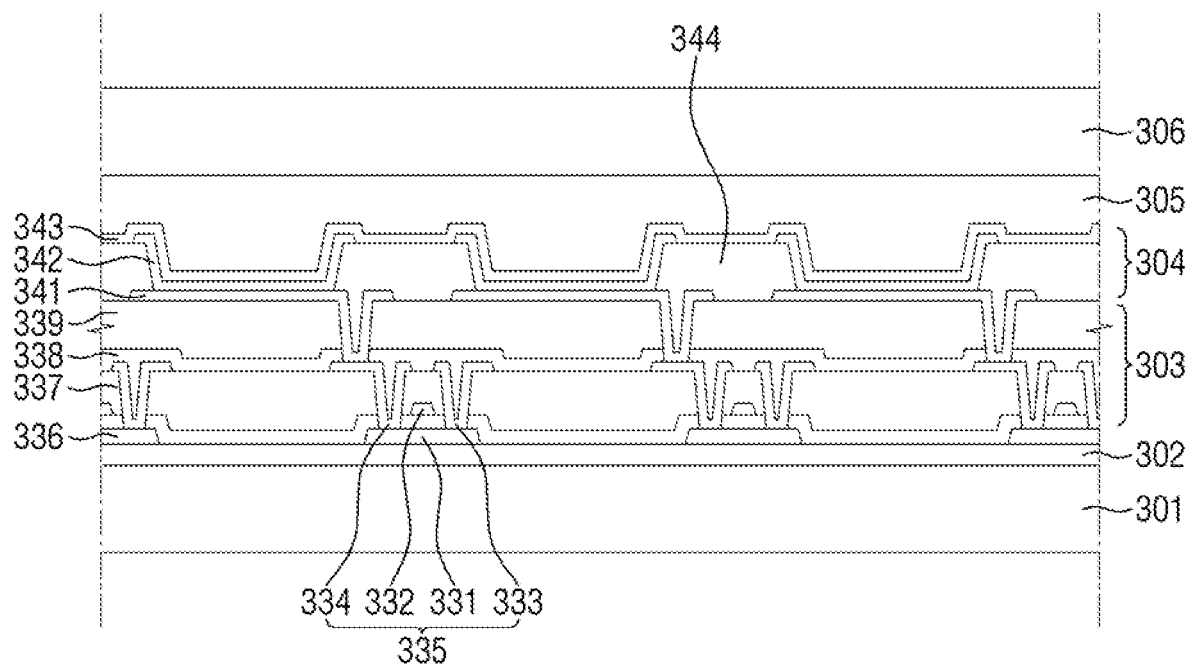
FIG. 7 is a cross-sectional view illustrating a display region of the display panel.

As shown in FIG. 7, a display region of the display panel 300 indicates a region where a light emitting element layer 304 displays an image, and a non-display region of the display panel 300 indicates a peripheral region of the display region where no image is displayed. The display panel 300 may include a support substrate 301, a flexible substrate 302, a thin film transistor layer 303, a light emitting element layer 304, and a thin film encapsulation layer 305.

The flexible substrate 302 is disposed on the support substrate 301. Each of the support substrate 301 and the flexible substrate 302 may include a flexible polymer material. For example, each of the support substrate 301 and the flexible substrate 302 may include polyethersulphone (PES), polyacrylate (PA), polyarylate (PAR), polyetherimide (PEI), polyethylenenaphthalate (PEN), polyethyleneterephthalate (PET), polyphenylenesulfide (PPS), polyallylate, polyimide (PI) polycarbonate (PC), cellulosetriacetate (CAT), cellulose acetate propionate (CAP), and/or a combination thereof.

The thin film transistor layer 303 is formed on the flexible substrate 302. The thin film transistor layer 303 includes thin film transistors 335, a gate insulating film 336, an interlayer insulating film 337, a protective film 338, and a planarization film 339.

A buffer film may be formed on the flexible substrate 302. The buffer film may be formed on the flexible substrate 302 and may protect the thin film transistors 335 and the light emitting elements from moisture permeating through the support substrate 301 and the flexible substrate 302. The buffer film may include a plurality of stacked inorganic films. The buffer film may be formed of a plurality of alternately stacked inorganic films. For example, the buffer film may be formed of multiple films in which one or more inorganic films of a silicon oxide film (SiOx), a silicon nitride film (SiNx), and SiON are alternately stacked. The buffer film may be omitted.

The thin film transistors 335 are formed on the buffer film. The thin film transistor 335 includes an active layer 331, a gate electrode 332, a source electrode 333, and a drain electrode 334. Although it is illustrated in FIG. 7 that the thin film transistor 335 is formed by a top gate method in which the gate electrode 332 is located above the active layer 331, the present disclosure is not limited thereto. For example, the thin film transistors 335 are formed by a bottom gate method in which the gate electrode 332 is located under the active layer 331, or a double gate method in which the gate electrode 332 is formed both above and under the active layer 331.

The active layer 331 is formed on the buffer film. The active layer 331 may be formed of a silicon-based semiconductor material or an oxide-based semiconductor material. A light shielding layer for shielding external light incident on the active layer 331 may be formed between the buffer film and the active layer 331.

The gate insulating film 336 may be formed on the active layer 331. The gate insulating film 316 may be formed of an inorganic film, for example, a silicon oxide film (SiOx), a silicon nitride film (SiNx), or a multilayer film thereof.

The gate electrode 332 and a gate line may be formed on the gate insulating film 316. The gate electrode 332 and gate line may have multiple layers or a single layer made of molybdenum (Mo), aluminum (Al), chromium (Cr), gold (Au), titanium (Ti), nickel (Ni), neodymium (Nd), and/or copper (Cu).

The interlayer insulating film 337 may be formed on the gate electrode 332 and the gate line. The interlayer insulating film 337 may include an inorganic film, for example, a silicon oxide film (SiOx), a silicon nitride film (SiNx), or a multilayer film thereof.

The source electrode 333, the drain electrode 334, and a data line may be formed on the interlayer insulating film 337. Each of the source electrode 333 and the drain electrode 334 may be connected to the active layer 331 via a contact hole passing through the gate insulating film 336 and the interlayer insulating film 317. The source electrode 133, the drain electrode 334, and the data line may have multiple layers or a single layer including molybdenum (Mo), aluminum (Al), chromium (Cr), gold (Au), titanium (Ti), nickel (Ni), neodymium (Nd), and/or copper (Cu).

The protective film 338, insulating the thin film transistor 335, may be formed on the source electrode 333, the drain electrode 334, and the data line. The protective film 338 may include an inorganic film for example, a silicon oxide film (SiOx), a silicon nitride film (SiNx), or a multilayer film thereof.

The planarization film 339 may be formed on the protective film 338 to flatten over a step caused by the thin film transistor 335. The planarization film 339 may be formed of an organic film made of acryl resin, epoxy resin, phenolic resin, polyamide resin, polyimide resin or the like.

The light emitting element layer 304 is formed on the thin film transistor layer 303. The light emitting element layer 304 includes light emitting elements and a pixel defining layer 344.

The light emitting elements and the pixel defining layer 344 are formed on the planarization film 339. The light emitting element may be an organic light emitting device. In this case, the light emitting element may include an anode electrode 341, a light emitting layer 342, and a cathode electrode 343.

The anode electrode 341 may be formed on the planarization film 339. The anode electrode 341 may be connected to the source electrode 333 of the thin film transistor 335 via the contact hole passing through the protective film 338 and the planarization film 339.

The pixel defining layer 344 may cover the edge of the anode electrode 341 on the planarization film 339 and may partition the pixels from each other. For example, the pixel defining layer 344 serves as a pixel defining layer for defining pixels. Each of the pixels indicates a region where the anode electrode 341, the light emitting layer 342, and the cathode electrode 343 are sequentially stacked such that holes from the anode electrode 341 and electrons from the cathode electrode 343 are combined to each other to emit light.

The light emitting layer 342 is formed on the anode electrode 341 and the pixel defining layer 344. The light emitting layer 342 may be an organic light emitting layer. The light emitting layer 342 may emit red light, green light, or blue light. The peak wavelength range of red light may be about 620 nm to 750 nm, and the peak wavelength range of green light may be about 495 nm to 570 nm. Further, the peak wavelength range of blue light may be about 450 nm to 495 nm. Alternatively, the light emitting layer 342 may be a white light emitting layer that emits white light. In this case, the light emitting layer 342 may be formed by stacking the red light emitting layer, the green light emitting layer and the blue light emitting layer, and may be a common layer formed commonly across all the pixels. In this case, the display panel 300 may further include separate color filters for displaying red, green and blue colors.

The light emitting layer 342 may include a hole transporting layer, a light emitting layer, and an electron transporting layer. Further, the light emitting layer 342 may be formed in a tandem structure of two or more stacks, in which case a charge generating layer may be formed between the stacks.

The cathode electrode 343 is formed on the light emitting layer 342. The second electrode 343 may cover the light emitting layer 342. The second electrode 343 may be a common layer formed commonly across all the pixels.

When the light emitting element layer 304 is formed as a top emission type to emit light in an upward direction, the anode electrode 341 may be formed of a metal material with high reflectivity, for example, a stacked structure of aluminum and titanium (Ti/Al/Ti), a stacked structure (ITO/Al/ITO) of aluminum and indium tin oxide (ITO) an APC alloy, and a stacked structure (ITO/APC/ITO) of an APC alloy and ITO. The APC alloy is an alloy of silver (Ag), palladium (Pd), and copper (Cu). The cathode electrode 261 may be formed of a transparent conductive material (TCO) such as ITO or indium zinc oxide (IZO) that can transmit light, or a semi-transmissive conductive material such as magnesium (Mg), silver (Ag), or an alloy of Mg and Ag. When the cathode electrode 343 is formed of a semi-transmissive conductive material, the light extraction efficiency can be increased by a microcavity effect.

When the light emitting element layer 304 is formed as a bottom emission type to emit light in a downward direction, the anode electrode 341 may be formed of a transparent conductive material (TCO) such as ITO or IZO, or a semi-transmissive conductive material such as magnesium (Mg), silver (Ag), or an alloy of Mg and Ag. The second electrode 343 may be formed of a metal material with high reflectivity, for example, a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO. As understood herein, the phrase "high reflectivity" may mean a reflectivity of visible light that is within the range established by the reflectivity of the above-named compositions. When the anode electrode 341 is formed of a semi-transmissive conductive material, the light extraction efficiency can be increased by a microcavity effect.

The thin film encapsulation layer 305 is formed on the light emitting element layer 304. The thin film encapsulation layer 305 prevents oxygen or moisture from permeating the light emitting layer 342 and the cathode electrode 343. To this end, the thin film encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, and/or titanium oxide. Further, the thin film encapsulation layer 305 may further include at least one organic film. The organic film may have a sufficient thickness to prevent particles from penetrating the thin film encapsulation layer 305 and being injected into the light emitting layer 342 and the cathode electrode 343. The organic film may include epoxy, acrylate, and/or urethane acrylate. A window layer 306 may be formed over the thin film encapsulation layer 305.

The display circuit board 310 may be attached to one side of the display panel 300. For example, one side of the display circuit board 310 may be attached on the pads provided on one side of the display panel 300 using an anisotropic conductive film. The display circuit board 310 may be bent towards the lower surface of the display panel 300. The touch circuit board 210 may also be bent towards the lower surface of the display panel 300. Accordingly, a touch connection portion disposed at one end of the touch circuit board 210 may be connected to a touch connector 312a of the display circuit board 310. A detailed description of the display circuit board 310 will be given later with reference to FIGS. 3 and 4.

The display driver 320 outputs signals and voltages for driving the display panel 300 through the display circuit board 310. The display driver 320 may include an integrated circuit mounted on the display circuit board 310, but the present disclosure is not limited thereto. For example, the display driver 320 may be directly mounted on the substrate of the display panel 300. In this case, the display driver 320 may be attached to the upper surface or the lower surface of the substrate of the display panel 300.

As shown in FIG. 6, a lower panel member 400 may be disposed below the display panel 300. The lower panel member 400 may be attached to the lower surface of the display panel 300 through a third adhesive member 930. The third adhesive member 930 may include an optically clear adhesive (OCA) or an optically clear resin (OCR).

The lower panel member 400 may include a light absorbing member for absorbing light incident from the outside, a buffer member for absorbing an external impact, a heat dissipation member for efficiently dissipating heat from the display panel 300, and/or a light blocking layer for blocking light incident from the outside.

The light absorbing member may be disposed below the display panel 300. The light absorbing member prevents various components (e.g., the first force sensor 510, the second force sensor 520, the display circuit board 310 and the like) arranged below the light absorbing member from being visible from the top of the display panel 300 by blocking the transmission of light. The light absorbing member may include a light absorbing material such as a black pigment or a dye.

The buffer member may be disposed below the light absorbing member. The buffer member absorbs an external impact to prevent the display panel 300 from being damaged. The buffer member may include a single layer or a plurality of layers. For example, the buffer member may be formed of polymer resin such as polyurethane, polycarbonate, polypropylene, or polyethylene, or may include a rubber, a urethane based material, and/or a sponge obtained by foam-molding an acryl-based material, or another material having similar elastic properties to any of the above-named materials. The buffer member may be a cushion layer.

The heat dissipation member may be disposed below the buffer member. The heat dissipation member may include a first heat dissipation layer including graphite and carbon nanotubes, and a second heat dissipation layer formed of a metal thin film such as copper, nickel, ferrite and silver, which can shield electromagnetic waves and have high thermal conductivity.

The first force sensor 510 and the second force sensor 520 may be disposed in the second region DR2. For example, the first force sensor 510 may be disposed below the display panel 300 at the right edge of the display panel 300. The second force sensor 520 may be disposed below the display panel 300 at the left edge of the display panel 300. As shown in FIGS. 1 and 2, the left and right sides of the display panel 300 are opposite to each other.

The first force sensor 510 and the second force sensor 520 may be attached to the lower surface of the lower panel member 400. The first force sensor 510 and the second force sensor 520 may be connected to the display circuit board 310 through the force sensing circuit board 550. Although it is illustrated in FIG. 3 that the first force sensor 510 and the second force sensor 520 are connected to one force sensing circuit board 550, the present disclosure is not limited thereto. The first force sensor 510 and the second force sensor 520 may be connected to the display circuit board 310 through different force sensing circuit boards 550.

As shown in FIG. 3, the force sensing unit 330 for sensing the force by driving the first force sensor 510 and the second force sensor 520 may be mounted on the display circuit board 310. In this case, the force sensing unit 330 may be formed as an integrated circuit. The force sensing unit 330 may be integrated with the display driver 320 to form one integrated circuit.

Alternatively, the force sensing circuit board 550 may be connected to the touch circuit board 210 rather than the display circuit board 310. In this case, the force sensing unit 330 may be mounted on the touch circuit board 210. The force sensing unit 330 may be integrated with the touch driver 220 to form one integrated circuit.

The lower frame 600 may be disposed below the lower panel member 400. The lower frame 600 may include synthetic resin, metal, or both synthetic resin and metal.

A waterproof member 610 may be disposed along the edge of the lower frame 600. The waterproof member 610 may be disposed on the outer side of the first force sensor 510 and on the outer side of the second force sensor 520. The waterproof member 610 may be adhered to the upper surface of the lower panel member 400 and the lower surface of the lower frame 600.

As shown in FIGS. 1 and 2, since the waterproof member 610 is disposed on the outer side of the first force sensor 510 and on the outer side of the second force sensor 520, it is possible to prevent moisture and dust from penetrating between the display panel 300 and the lower frame 600. For example, it is possible to provide the display device 10 which is waterproof and dustproof.

The lower frame 600 may include a first camera hole CMH1 for inserting a camera device 720, a battery hole BH for dissipating heat generated from a battery, and a cable hole CAH through which a second connection cable 314 connected to the display circuit board 310 passes. For example, the cable hole CAH may be disposed near the right edge of the lower frame 600. In this case, the cable hole CAH may be covered by the first force sensor 510 disposed below the panel lower member 400 at the right edge of the display panel 300. Therefore, the first force sensor 510 may include a first concave portion NTH1 formed concavely in a notch shape on one side so as to expose the cable hole CAH as shown in FIG. 2.

Further, the lower frame 600 is disposed below the lower panel member 400 of the display panel 300, the first force sensor 510, and the second force sensor 520. The lower frame 600 can support the first force sensor 510 and the second force sensor 520 when a force is applied to the first force sensor 510 and the second force sensor 520. Accordingly, the first force sensor 510 and the second force sensor 520 can sense the applied force.

The main circuit board 700 may be disposed below the lower frame 600. The main circuit board 700 may be a printed circuit board or a flexible printed circuit board.

The main circuit board 700 may include a main processor 710, a camera device 720, and a main connector 730. The main processor 710 and the main connector 730 may be disposed on the lower surface of the main circuit board 700 facing the lower cover 900. In addition, the camera device 720 may be disposed on both the upper and lower surfaces of the main circuit board 700.

The main processor 710 may be configured to control all the functions of the display device 10. For example, the main processor 710 may output image data to the display driver 320 of the display circuit board 310 so that the display panel 300 displays an image. Further, the main processor 710 may receive touch data from the touch driver 220 and determine the position of the user's touch therefrom, and then execute an application indicated by an icon displayed at the associated touch position. Further, the main processor 710 may receive force sensing data from the touch driver 220 or the force sensing unit 330 and execute an application indicated by an icon displayed at the force position of the user according to the force sensing data. In addition, the main processor 710 may control a vibration generator 901 to vibrate according to the force sensing data to implement haptics, which may include a directed vibration that may be felt by the user. The main processor 710 may be an application processor, a central processing unit, or a system chip including an integrated circuit.

The camera device 720 processes an image frame such as a still image or a moving image obtained by an image sensor in a camera mode and outputs the processed image frame to the main processor 710.

The second connection cable 314 that has passed through the cable hole CAH of the lower frame 600 may be connected to the main connector 730 disposed on the lower surface of the main circuit board 700 through a gap between the lower frame 600 and the main circuit board 700. Accordingly, the main circuit board 700 may be electrically connected to the display circuit board 310 and the touch circuit board 210.

In addition, the main circuit board 700 may further include a mobile communication module capable of transmitting and receiving a wireless signal with a base station, an external terminal, and/or a server in a mobile communication network. The wireless signal may include a voice signal, a video call signal, or various types of data according to transmission and reception of text/multimedia messages. In addition, the main circuit board 700 may further include an audio output device such as a speaker capable of outputting sound.

The lower cover 900 may be disposed below the lower frame 600 and the main circuit board 709. The lower cover 900 may be fastened and fixed to the lower frame 600. The lower cover 900 may form an external appearance of the lower surface of the display device 10. The lower cover 900 may include plastic and/or metal.

A second camera hole CMH2 may be formed in the lower cover 900 such that the camera device 720 is inserted into the second camera hole CMH2 to protrude outwardly. The positions of the camera device 720 and the positions of the first and second camera holes CMH1 and CMH2 corresponding to the camera device 720 are not limited to the arrangements shown in FIGS. 1, 2, 4 and 5.

Further, the vibration generator 901 may be disposed on the upper surface of the lower cover 900 and the vibration generator 901 may be connected to the lower surface of the main circuit board 700. Accordingly, the vibration generator 901 may generate vibration in response to a vibration signal of the main processor 710. The vibration generator 901 may be an eccentric rotating mass (ERM), a linear resonant actuator (LRA), and/or a piezo actuator.

Figure 4:
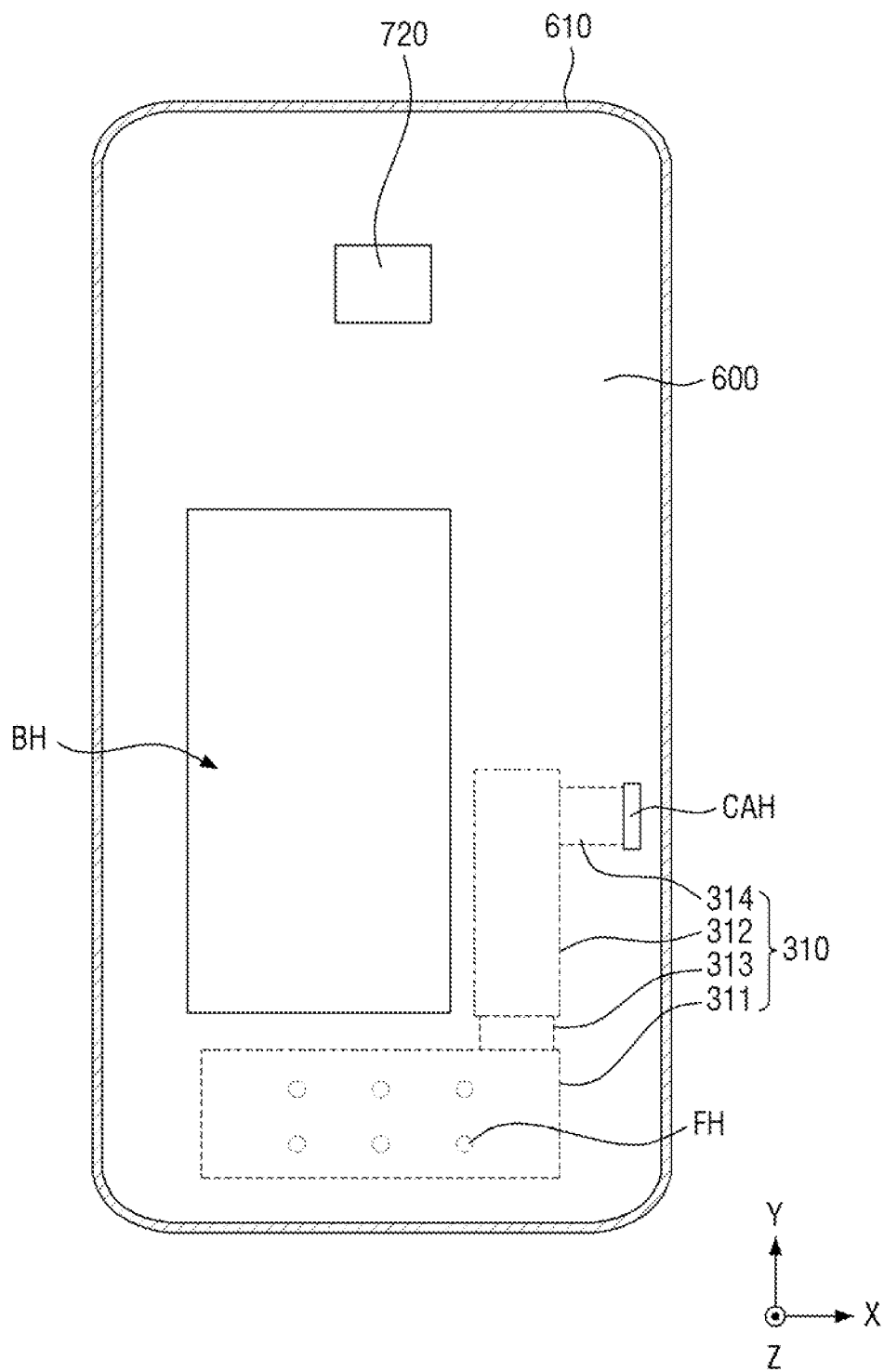
FIG. 4 is a plan view illustrating an example of a lower frame of FIG. 2.
Figure 5:
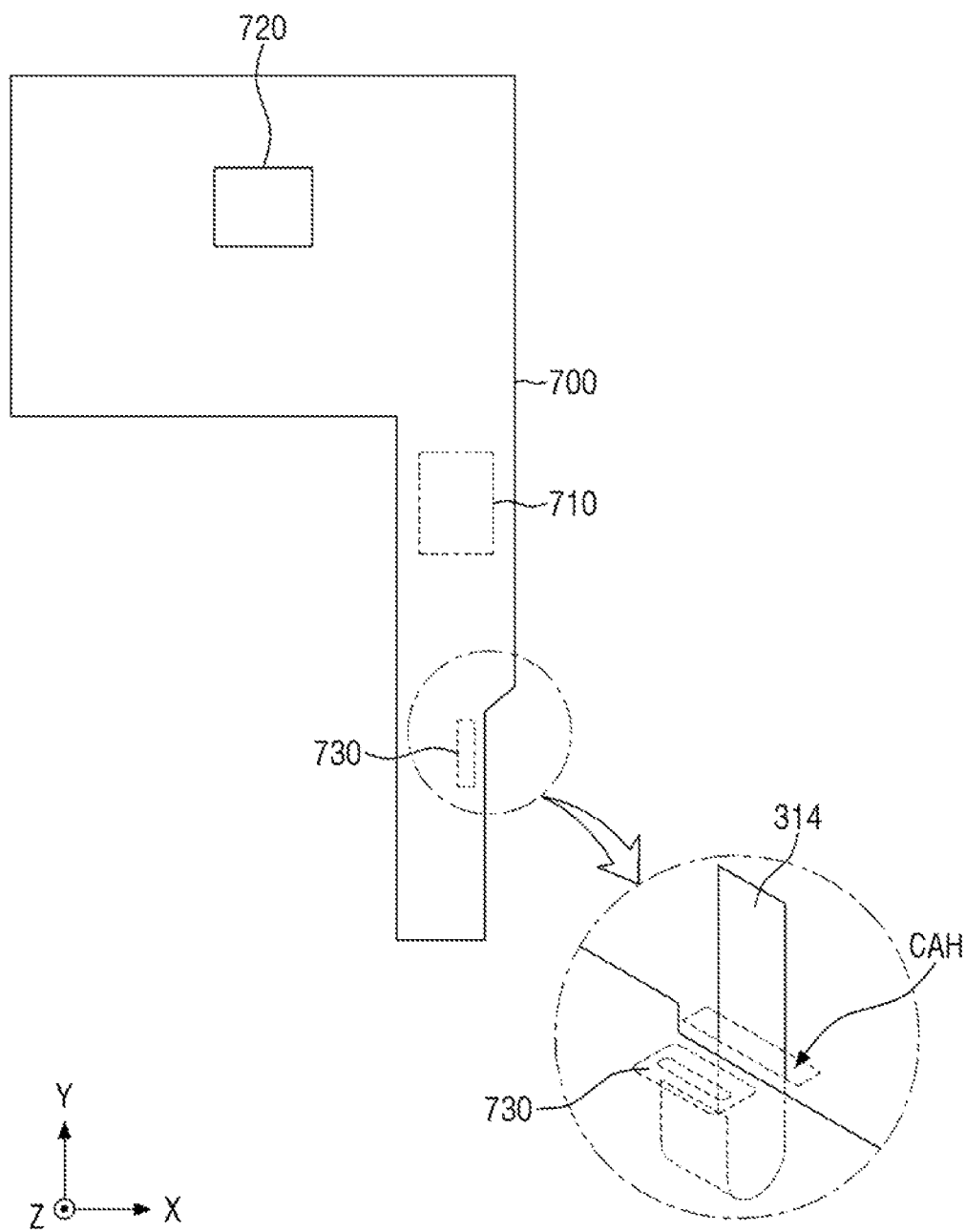
FIG. 5 is a plan view illustrating an example of a main circuit board of FIG. 2.

FIG. 3 is a bottom view illustrating an example of the display panel attached to the cover window of FIG. 2. FIG. 4 is a plan view showing an example of the lower frame of FIG. 2. FIG. 5 is a plan view showing an example of the main circuit board of FIG. 2.

Hereinafter, a connection between the display circuit board 310 and the third circuit board 550 and a connection between the second connection cable 314 and the main connector 730 of the main circuit board 700 will be described in detail with reference to FIGS. 3 to 5. FIG. 3 is a bottom view, whereas FIGS. 4 and 5 are plan views. Therefore, it should be noted that the left and right of the display device 10 in FIGS. 4 and 5 are reversed in FIG. 3, as compared to what is shown in FIGS. 4 and 5. For convenience of explanation, the display circuit board 310 is shown by a dotted line in FIG. 4, and the second connection cable 314 is shown by a broken line in FIG. 5.

Referring to FIGS. 3 to 5, the display circuit board 310 may include a first circuit board 311, a second circuit board 312, and a first connection cable 313.

The first circuit board 311 is attached to one side of the upper surface or the lower surface of the substrate of the display panel 300 and may be bent towards the lower surface of the substrate of the display panel 300. The first circuit board 311 may be fixed to fixing holes FH formed in the lower frame 600, as shown in FIG. 4, by fixing members.

The first circuit board 311 may include the display driver 320, the force sensing unit 330, a first connector 311a, and a second connector 311b. The display driver 320, the force sensing unit 330, the first connector 311a, and the second connector 311b may be disposed on one surface of the first circuit board 311.

The first connector 311a may be connected to one end of the first connection cable 313 connected to the second circuit board 312. Accordingly, the display driver 320 and the force sensing unit 330 mounted on the first circuit board 311 may be electrically connected to the second circuit board 312 through the first connection cable 313.

The second connector 311b may be connected to one end of the third circuit board 550 connected to the first force sensor 510 and the second force sensor 520. Accordingly, the first force sensor 510 and the second force sensor 520 may be electrically connected to the force sensing unit 330.

The second circuit board 312 may include the touch connector 312a, a first connection connector 312b, and a second connection connector 312c. The first connection connector 312b and the second connection connector 312c may be disposed on one surface of the second circuit board 312, and the touch connector 31.2a may be disposed on the other surface of the second circuit board 312.

The touch connector 312a may be connected to a touch connection portion provided at one end of the touch circuit board 210. Accordingly, the touch driver 220 may be electrically connected to the second circuit board 312.

The first connection connector 312b may be connected to the other end of the first connection cable 313 connected to the first circuit board 311. Accordingly, the display driver 320 and the force sensing unit 330 mounted on the first circuit board 311 may be electrically connected to the second circuit board 312 through the first connection cable 313.

The second connection connector 312c may be connected to one end of the second connection cable 314 connected to the main connector 730 of the main circuit board 700. Accordingly, the second circuit board 312 may be electrically connected to the second circuit board 312 through the second connection cable 314.

A connector connection portion 315 may be formed at the other end of the second connection cable 314. The connector connection portion 315 of the second connection cable 314 may extend to a lower portion of the lower frame 600 through the cable hole CAH of the lower frame 600, as shown in FIGS. 3 and 4. Since a first recess NTH1 having a notch shape is formed on the inner side of the first force sensor 10 in a region corresponding to the cable hole CAH of the lower frame 600, the cable hole CAH of the lower frame 600 may be exposed without being covered by the first force sensor 510.

Further, since there is a gap between the lower frame 600 and the main circuit board 700, as shown in FIG. 5, the connector connection portion 315 of the second connection cable 314, which has passed through the cable hole CAH, may extend to a lower portion of the main circuit board 700 through the gap between the frame 600 and the main circuit board 700. Finally, the connector connection portion 315 of the second connection cable 314 may be connected to the main connector 730 disposed on the lower surface of the main circuit board 700.

As shown in FIGS. 3 to 5, the first recess NTH1 having a notch shape is formed on one side of the first three sensor 510 so as not to cover the cable hole CAH of the lower frame 600. Accordingly, the second connection cable 314 connected to the display circuit board 310 may extend to the lower portion of the lower frame 600 through the cable hole CAH to be connected to the main connector 730 of the main circuit board 700. Therefore, the display circuit board 310 and the main circuit board 700 can be stably connected.

FIG. 6 is a cross-sectional view taken along line I-I' of FIG. 3.

Referring to FIG. 6, the cover window 100, the touch sensing device 200, the display panel 300, the lower panel member 400 and the lower frame 600 may be formed in a flat shape in the first region DR1 and may be formed in a curved shape in the second region DR2.

The first force sensor 510 may be disposed in the second region DR2 corresponding to a curved portion of the display device 10. First humps 530 may be disposed at an upper portion of the first force sensor 510. Each of the first bumps 530 may be attached to the lower surface of the lower panel member 400 through a fourth adhesive member 940 and attached to the upper surface of the first force sensor 510 through a sixth adhesive member 960. Further, the first force sensor 510 may be attached to the upper surface of the lower frame 600 through a fifth adhesive member 950. Each of the fourth adhesive member 940, the fifth adhesive member 950 and the sixth adhesive member 960 may be a force sensitive adhesive (PSA). Any one or more of the fourth adhesive member 940 and the fifth adhesive member 950 may be omitted.

The waterproof member 610 may be disposed on the outer side of the first force sensor 510. For example, the waterproof member 610 may be disposed on one side of the first force sensor 510, and one side surface of the first force sensor 510 may be disposed closer to one side edge of the display panel 300 than the other side surfaces of the first force sensor 510. For example, when the first force sensor 510 is disposed at the right edge of the display panel 300, as shown in FIG. 6 the waterproof member 610 may be disposed on the right side surface of the first force sensor 510.

The waterproof member 610 may be attached to the lower surface of the panel lower member 400 and the upper surface of the lower frame 600. To this end, the waterproof member 610 may include a base film and a first adhesive film disposed on one surface of the base film, and a second adhesive film disposed on the other surface of the base film. The base film may include polyethylene terephthalate (PET), polyethylene terephthalate (PET) and a separate cushion layer, or polyethylene foam (PE foam). Each of the first adhesive film and the second adhesive film may be a force sensitive adhesive (PSA). The first adhesive film may be adhered to the lower surface of the lower panel member 400 and the second adhesive film may be adhered to the upper surface of the lower frame 600.

Since the waterproof member 610 is pressed and attached to the lower surface of the panel lower member 400 and the upper surface of the lower frame 600, when the height of the waterproof member 610 is lower than the sum of the height of the first force sensor 510 and the height of the first bump 530, the first force sensor 510 may be damaged by the force attaching the waterproof member 610. Therefore, the height of the waterproof member 610 is preferably higher than the sum of the height of the first force sensor 510 and the height of the first bump 530. However, when the height of the waterproof member 610 is much higher than the sum of the height of the first force sensor 510 and the height of the first bump 530, the force might not be sensed by the first force sensor 510. Therefore, it is preferable to determine the height of the waterproof member 610 in advance through a preliminary experiment in consideration of the fact that the first force sensor 510 is damaged by the force for attaching the waterproof member 610 and whether the force is sensed by the first force sensor 510 after attachment of the waterproof member 610.

Further, in order for the first bumps 530 to press force-sensitive cells CE1 to CE8 of the first force sensor 510 according to the force of the user, it is preferable that the height of the first bump 530 is higher than the height of the first force sensor 510.

Further, the width of the waterproof member 610 is preferably at least 1 mm to prevent penetration of moisture and dust therethrough.

As shown in FIG. 6 since the waterproof member 610 is disposed on the outer side of the first force sensor 510 and attached to the lower surface of the lower panel member 400 and the upper surface of the lower frame 600, it is possible for the waterproof member 610 to prevent moisture and dust from penetrating between the display panel 300 and the lower frame 600. Accordingly, it is possible to provide the display device 10 which is waterproof and dustproof.

Meanwhile, since the second force sensor 520 is disposed at the left edge of the display panel 300, the waterproof member 610 is disposed on the left side surface of the second force sensor 520. Accordingly, since there is a difference from the arrangement positions of the waterproof member 610 and the first force sensor 510, a detailed description of the arrangement positions of the waterproof member 610 and the second force sensor 520 will be omitted.

Figure 8:
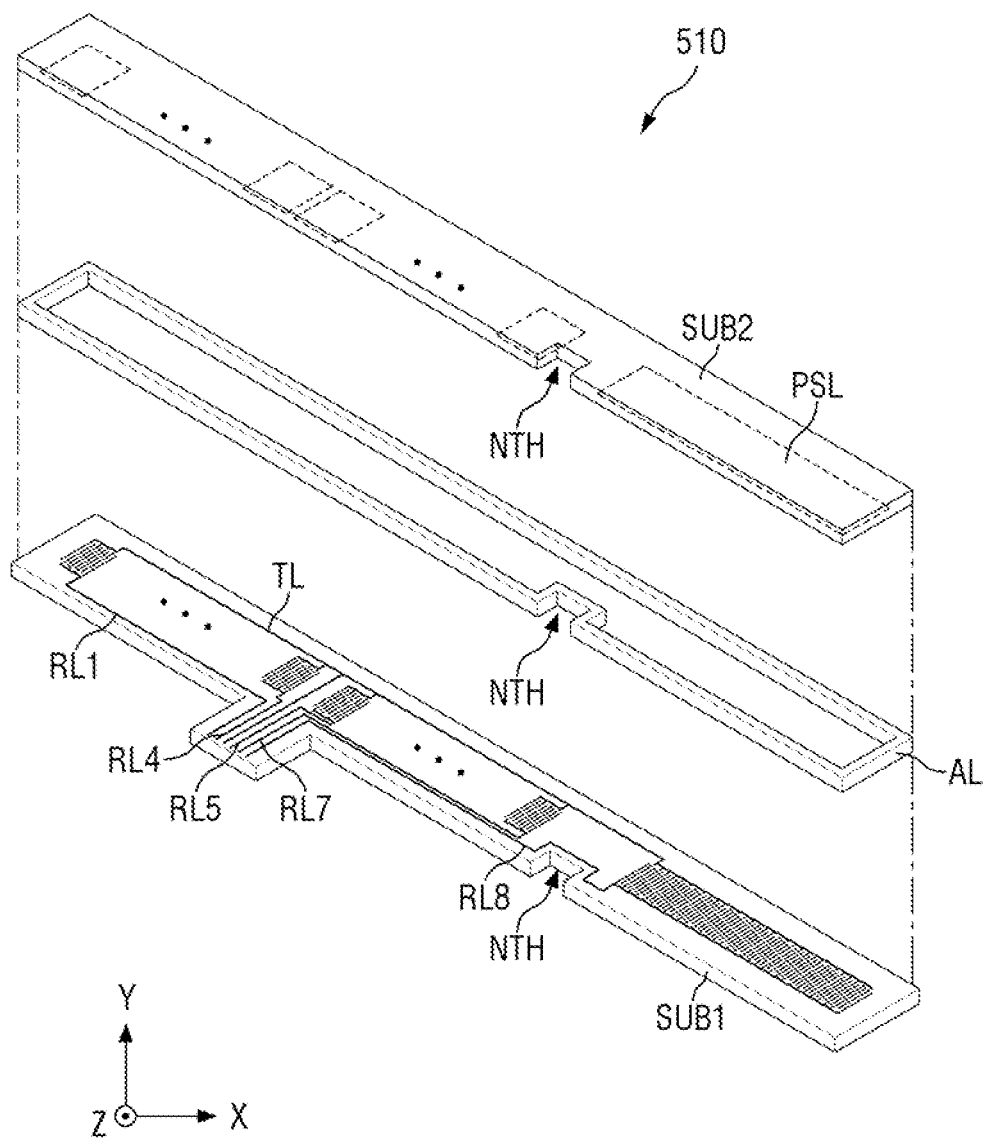
FIG. 8 is a perspective view illustrating a force sensor according to an exemplary embodiment of the present inventive concept.
Figure 9:
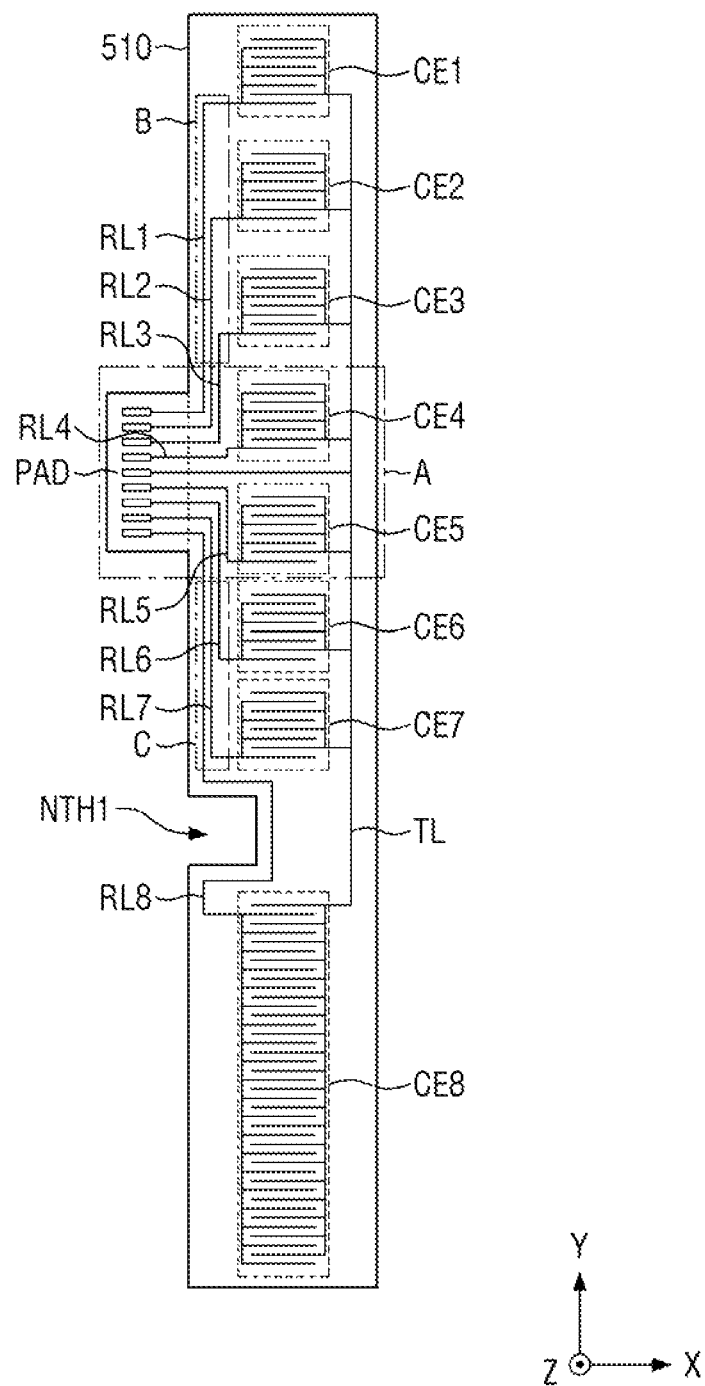
FIG. 9 is a plan view illustrating a force sensor according to an exemplary embodiment of the present inventive concept.

FIG. 8 is a perspective view illustrating a force sensor according to an exemplary embodiment of the present inventive concept. FIG. 9 is a plan view showing a force sensor according to an exemplary embodiment of the present inventive concept.

Referring to FIGS. 8 and 9, the first force sensor 510 may include a first substrate SUB1, a second substrate SUB2, a driving line TL, sensing lines RL1 to RL8, first to eighth force-sensitive cells CE1 to CE8, a driving pad TPD, sensing pads RPD, and an adhesive layer AL.

The first substrate SUB1 and the second substrate SUB2 are arranged to face each other. Each of the first substrate SUB1 and the second substrate SUB2 may include a polyethylene, a polyimide, a polycarbonate, a polysulfone a polyacrylate, a polystyrene, a polyvinyl chloride, a polyvinyl alcohol, a polynorbornene, and/or a polyester. In one embodiment, the first substrate SUB1 and the second substrate SUB2 may be formed of a polyethylene terephthalate (PET) film or a polyimide film.

Each of the first substrate SUB1 and the second substrate SUB2 may have a rectangular planar shape having a pair of short sides in the first direction (X-axis direction) and a pair of long sides in the second direction (Y-axis direction). However, the planar shape of each of the first substrate SUB1 and the second substrate SUB2 is not limited thereto, and may vary depending on the applied position.

Notch-shaped recesses NTH1 and NTH2 may be formed on one side of the first substrate SUB1 and one side of the second substrate SUB2 so as not to cover the cable hole CAH of the lower frame 600. The recess NTH1 of the first substrate SUB1 and the recess NTH2 of the second substrate SUB2 may at least partially overlap each other.

A pad portion PAD to which the force sensing circuit board 550 is attached may be formed on the first substrate SUB1. The pad portion PAD may be exposed to the outside without being covered by the second substrate SUB2. The pad portion PAD may protrude from one side surface of the first substrate SUB1. Although it is illustrated in FIGS. 8 and 9 that the pad portion PAD protrudes from one side surface corresponding to the long side of the first substrate SUB1, the present disclosure is not limited thereto and the pad portion PAD may alternatively protrude from one side surface corresponding to the short side of the first substrate SUB1.

The pad portion PAD may include a driving pad TPD connected to the driving line TL and sensing pads RD connected to the sensing lines RL1 to RL8. The force sensing circuit board 550 may be attached onto the driving pad TPD and the sensing pads RD.

The force sensitive cells CE1 to CE8 are disposed between the first substrate SUB1 and the second substrate SUB2. FIGS. 8 and 9 illustrate that the first force sensor 510 includes eight force sensitive cells CE1 to CE8, but the number of the force sensitive cells CE1 to CE8 is not limited thereto.

Each of the force sensitive cells CE1 to CE8 may independently detect the force at the corresponding position. Although FIGS. 8 and 9 illustrate that the force sensitive cells CE1 to CB8 are arranged in one row, the present disclosure is not limited thereto. The force sensitive cells CE1 to CE8 may alternatively be arranged in a plurality of rows. The force sensitive cells CE1 to CBS may be disposed at predetermined intervals as, shown in FIGS. 8 and 9, or may be disposed continuously (e.g. in an abutting manner).

Figure 26:
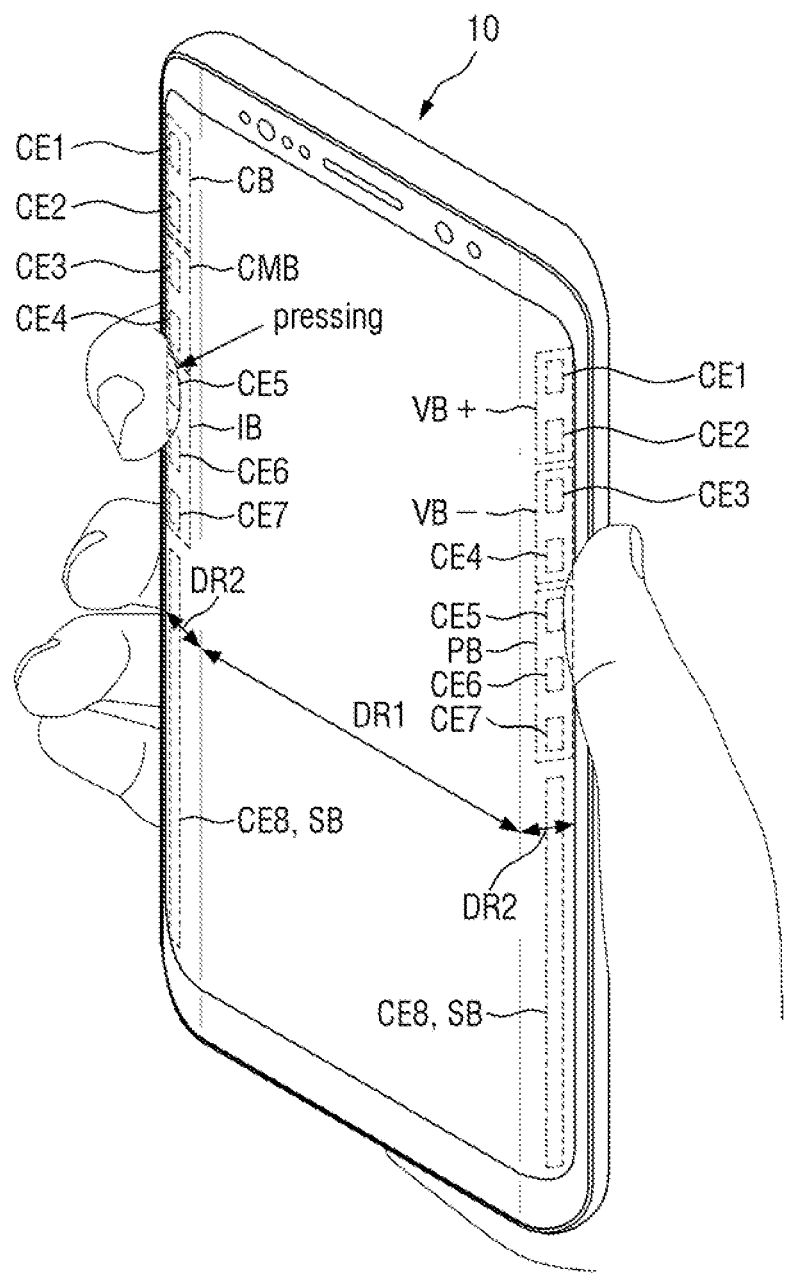
FIGS. 26 and 27 are perspective views illustrating an example of a display device which utilizes first and second force sensors, according to an exemplary embodiment of the present inventive concept, as a physical button.
Figure 27:
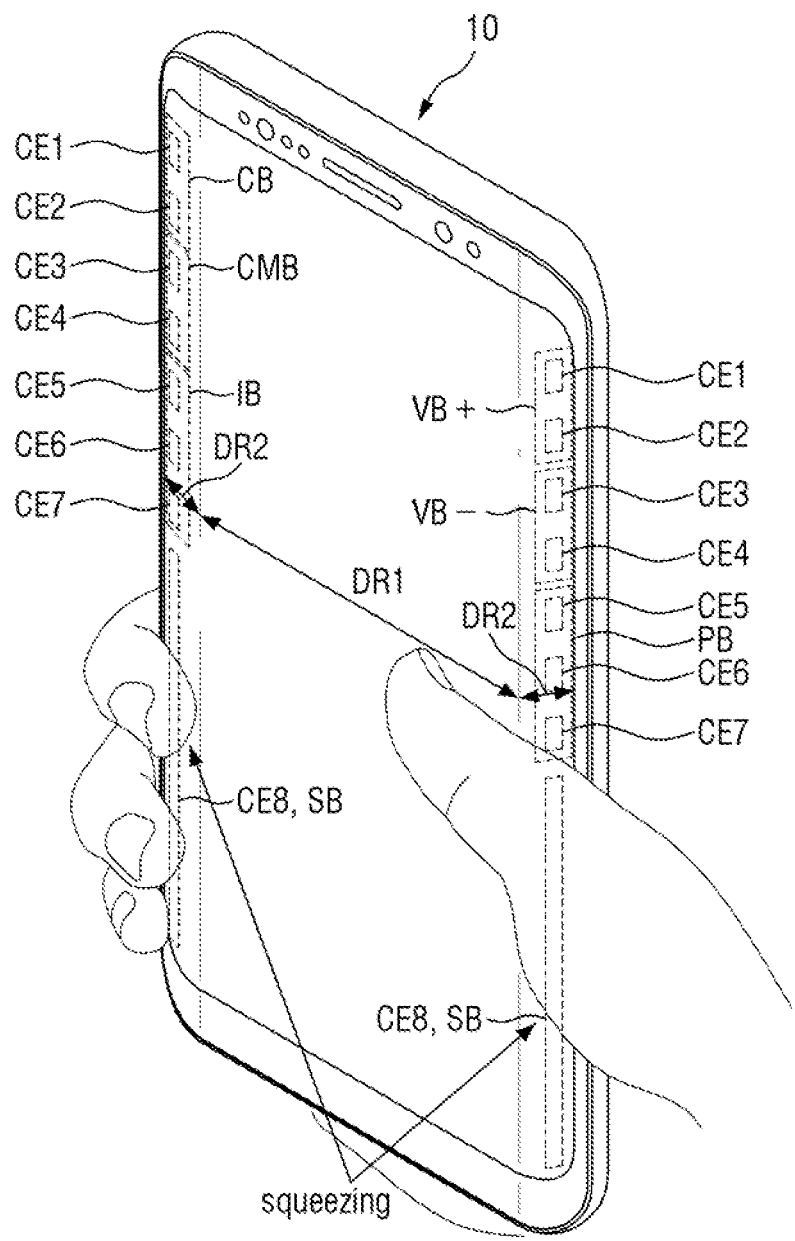

The force sensitive cells CE1 to CE8 may have different areas according to their intended use. For example, as shown in FIG. 26, the first to seventh force sensitive cells CE1 to CE7 may be used as a physical button such as volume control buttons VB+ and VB− or a power button PB disposed at one side edge of the display device 10. Alternatively, as shown in FIG. 27, the eighth force sensing cell CE8 may be used as a button SB for sensing the squeezing force of the user. In this case, the eighth force sensing cell CE8 may be formed to have a wider area than the first to seventh force sensitive cells CE1 to CE7. The eighth force sensing cell CE8 may be formed to be longer than the first to seventh force sensitive cells CE1 to CE7 in the longitudinal direction (Y-axis direction) of the first force sensor 510.

Also, it is illustrated in FIGS. 8 and 9 that the first to seventh force sensitive cells CE1 to CE7 used as a physical button are formed to have the same area, but the present disclosure is not limited thereto. For example, the areas of the first to seventh force sensitive cells CE1 to CE7 may be different from each other. Alternatively, some of the first to seventh force sensitive cells CE1 to CE7 may have the same area and the remaining force sensitive cells may have the same area, but the area of some of the first to seventh force sensitive cells CE1 to CE7 may be different from the area of the remaining force sensitive cells.

Each of the three sensitive cells CE1 to CE8 may include driving electrodes TE and sensing electrodes RE disposed on one surface of the first substrate SUB1 facing the second substrate SUB2, and a force sensitive layer PSL disposed on one surface of the second substrate SUB2 facing the first substrate SUB1. The driving electrodes TE and the sensing electrodes RE may be alternately arranged. Any one of the driving electrodes TE may be connected to the driving line TL, and any one of the sensing electrodes RE may be connected to any one of the sensing lines RL1 to RL8. The force sensitive layer PSL may at least partially overlap the driving electrodes TE and the sensing electrodes RE.

The driving line TL, the sensing lines RL1 to RL8, the driving pad TPD, and the sensing pads RPD are disposed on one surface of the first substrate SUB1. The driving line TL may be connected commonly to the force sensitive cells CE1 to CE8 while the sensing lines RL1 to RL8 may be connected one-to-one to the force sensitive cells CE1 to CE8. The driving pad TPD may be connected to the driving line TL and the sensing pads RPD may be connected to the sensing lines RL1 to RL8 on a one-to-one basis. Although FIGS. 8 and 9 illustrate that the first force sensor 510 includes eight sensing lines RL1 to RL8, the number of sensing lines RL1 to RL8 is not limited thereto.

Figure 14:
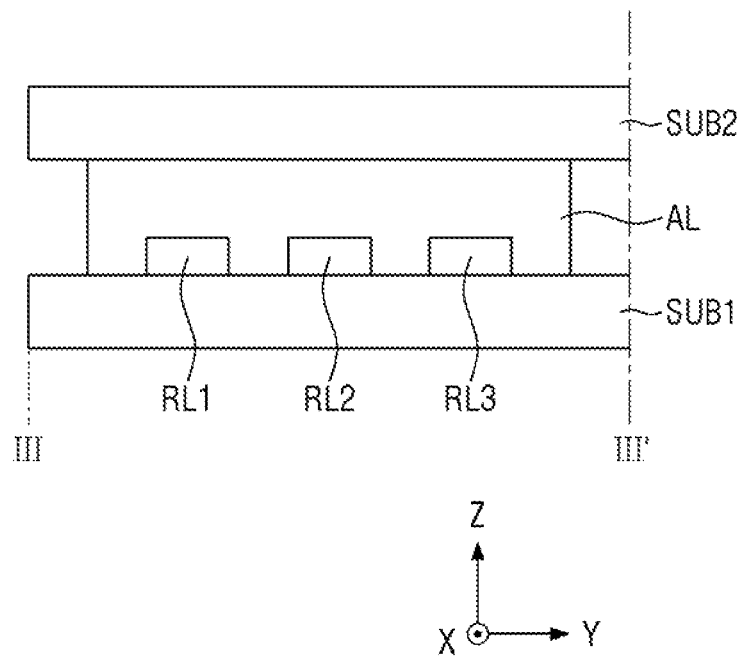
FIG. 14 is a cross-sectional view taken along line III-III' of FIG. 10.
Figure 15:
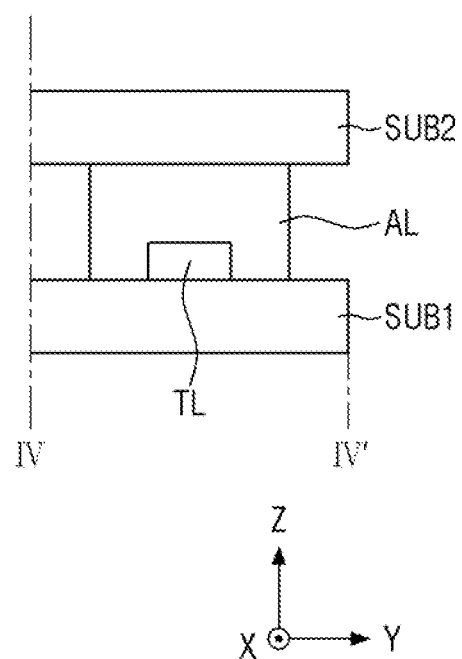
FIG. 15 is a cross-sectional view taken along line IV-IV' of FIG. 10.

The adhesive layer AL is disposed between the first substrate SUB1 and the second substrate SUB2 to adhere the first substrate SUB1 to the second substrate SUB2 as shown in FIGS. 14 and 15. The adhesive layer AL may be a force sensitive adhesive, or a double-sided tape.

The adhesive layer AL may be disposed along the edges of the first substrate SUB1 and the second substrate SUB2. For example, the adhesive layer AL may be disposed so as to completely surround the edges of the first substrate SUB1 and the second substrate SUB2 except for the pad portion PAD. In addition, the adhesive layer AL may serve as a spacer to keep constant intervals between the first substrate SUB1 and the second substrate SUB2.

The adhesive layer AL may be disposed to overlap the driving line TL and the sensing lines RL1 to RLp. For example, the adhesive layer AL may be disposed on the sensing lines RL1 to RLp, as shown in FIG. 14, or on the driving line TL, as shown in FIG. 15. In this case, the adhesive layer AL may serve as an insulating layer insulating the driving line TL and the sensing lines RL1 to RLp, thereby preventing the driving line TL and the sensing lines RL1 to RLp from being exposed to the outside and oxidized.

A notch-shaped recess NTH1 may be formed on one side of the adhesive layer AL so as not to cover the cable hole CAH of the lower frame 600 described with reference to FIGS. 3 to 5. The recess NTH1 of the adhesive layer AL may at least partially overlap the recess NTH1 of the first substrate SUB1 and the recess NTH2 of the second substrate SUB2.

The adhesive layer AL may be attached to one surface of the first substrate SUB1 or one surface of the second substrate SUB2 and then attached to one surface of the other substrate in a process of bonding the first substrate SUB1 and the second substrate SUB2. For example, the adhesive layer AL may be provided on each of one surface of the first substrate SUB1 and one surface of the second substrate SUB2, and in a process of bonding the first substrate SUB1 and the second substrate SUB2, the adhesive layer AL of the first substrate SUB1 and the adhesive layer AL of the second substrate SUB2 may be attached to each other.

The first bumps 530 may be disposed on the other surface of the second substrate SUB2. The other surface of the second substrate SUB2 may be the opposite surface of one surface of the second substrate SUB2. The first bumps 530 may at least partially overlap the force sensitive cells CE1 to CE8. The first bumps 530 serve to press the force sensitive cells CE1 to CE8 according to the force of the user.

In order to increase the force applied to the force sensitive cells CE1 to CE8 by the first bumps 530, each of the first bumps 530 may be formed to have a smaller area than each of the force sensitive cells CE1 to CE8. Each of the first bumps 530 may be formed to have an area smaller than the force sensitive layer PSL of each of the force sensitive cells CE1 to CE8.

The area of the first bump 530 may be proportional to the area of the force sensitive cell. For example, when the area of the eighth force sensitive cell CE8 is larger than the area of each of the first to seventh force sensitive cells CE1 to CE7 as shown in FIG. 8, the area of the first bump 530 overlapping the eighth force sensitive cell CE8 may be larger than the area of each of the first bumps 530 overlapping the first to seventh force sensitive cells CE1 to CE7.

Meanwhile, since the second force sensor 520 is different from the first force sensor 510 shown in FIGS. 8 and 9 in that the second force sensor 520 does not include the recess NTH1, a detailed description of the second force sensor 520 will be omitted.

Figure 10:
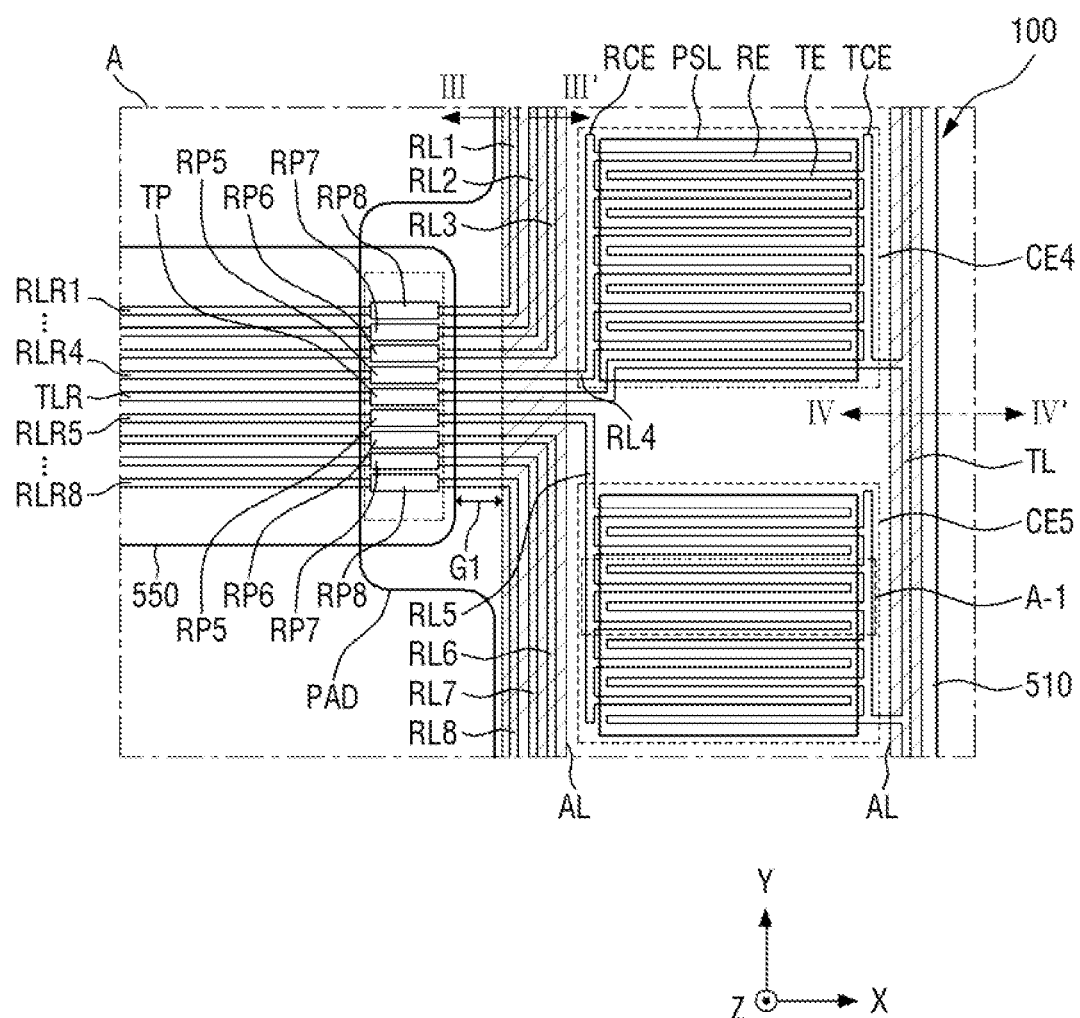
FIG. 10 is an enlarged plan view illustrating an example of region A of FIG. 9.
Figure 11:
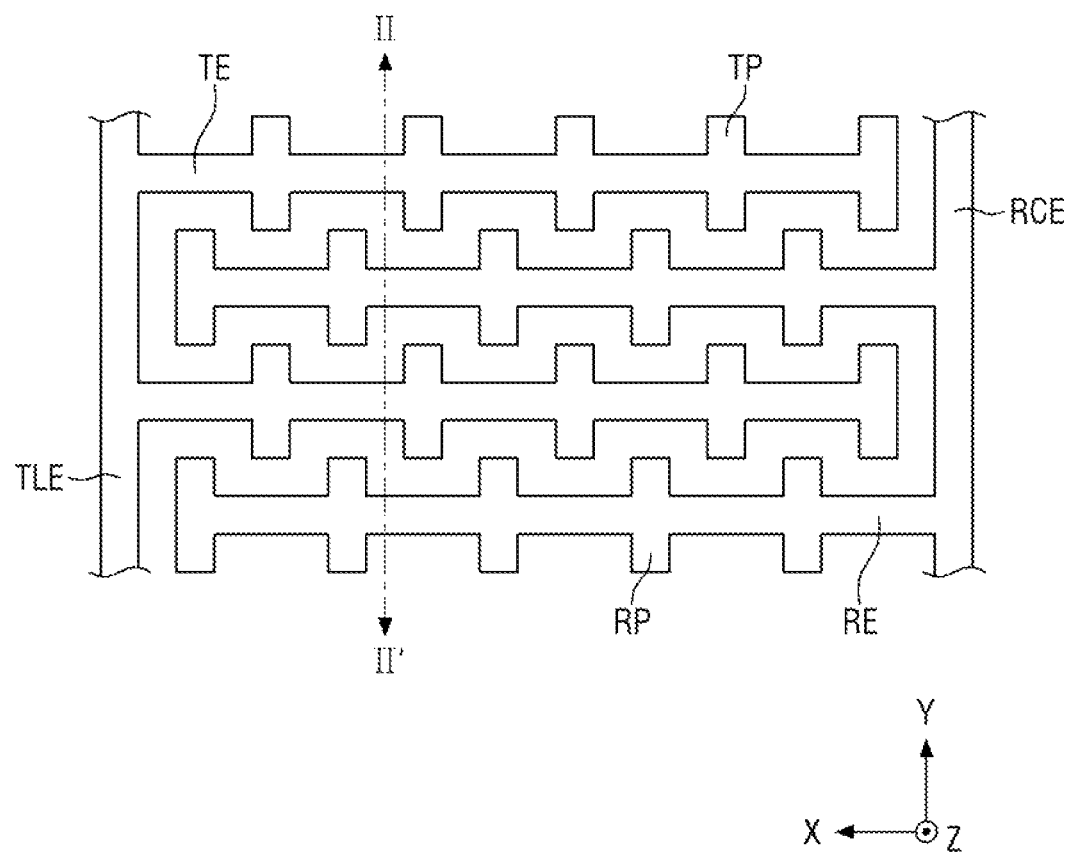
FIG. 11 is an enlarged plan view illustrating an example of region A-1 of FIG. 10.
Figure 12:
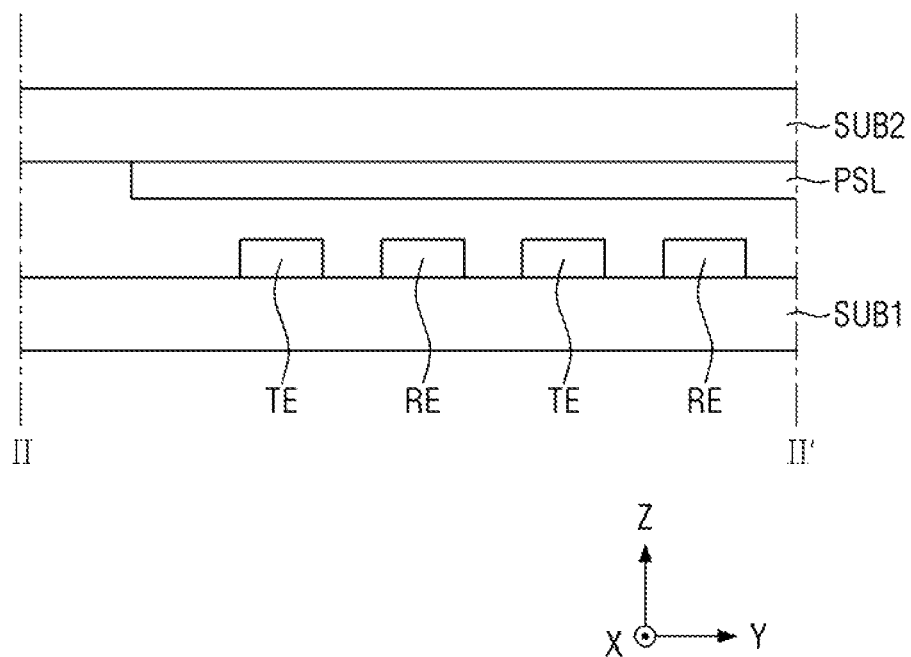
FIG. 12 is a cross-sectional view taken along line II-II' of FIG. 11.

FIG. 10 is an enlarged plan view illustrating an example of region A of FIG. 9. FIG. 11 is an enlarged plan view illustrating an example of region A-1 of FIG. 10. FIG. 12 is a cross-sectional view taken along line II-II' of FIG. 11.

For simplicity of description, FIG. 10 illustrates only the fourth force sensitive cell CE4, the fifth force sensitive cell CE5, the driving line TL, the first to eighth sensing lines RL1 to RL8 connected to the first to eighth force sensitive cells CE1 to CE8, the driving pad TPD, the sensing pads RPD, and the adhesive layer AL. In addition, FIG. 10 shows the force sensing circuit board 550 attached onto the driving pad TPD and the sensing pads RPD.

Referring to FIGS. 10 to 12, each of the force sensitive cells CE1 to CE8 may be connected to at least one driving line and at least one sensing line. For example, while the force sensitive cells CE1 to CE8 are connected commonly to one driving line TL, they may be connected one-to-one to the sensing lines RL1 to RL5. As shown in FIG. 10, the fourth force sensitive cell CE4 may be connected to the driving line TL and the fourth sensing line RL4, and the fifth force sensitive cell CE5 may be connected to the driving line TL and the fifth sensing, line RL5. Further, the driving line TL may be connected to the driving pad TPD, and the sensing lines RL1 to RL5 may be connected one-to-one to the sensing pads RPD.

The driving pad TPD and the sensing pads RP1 to RP8 may be disposed on the pad portion PAD. The driving pad TPD may be connected to a driving lead line TLR of the force sensing circuit board 550, and the sensing pads RP1 to RP8 may be connected one-to-one to sensing lead lines RLR1 to RLR8 of the force sensing circuit board 550. Since the force sensing circuit board 550 is connected to the display circuit board 310, the first force sensor 510 may be electrically connected to the force sensing unit 330 mounted on the display circuit board 310. Therefore, the force sensing unit 330 may apply a driving voltage, to the driving line TL through the driving lead line TLR of the force sensing circuit board 550 and the driving pad TPD of the first force sensor 510. Also, by detecting current values or voltage values from the sensing lines RE1 to RL8 through the sensing lead lines RLR1 to RLR8 connected to the sensing pads RP1 to RP8 of the first force sensor 510, it is possible to detect the force applied to the force sensitive cells CE1 to CE8.

Each of the force sensitive cells CE1 to CE8 includes a driving connection electrode TCE, a sensing connection electrode RCE, driving electrodes TE, sensing electrodes RE, and a force sensitive layer PSL, as shown in FIG. 11.

The driving connection electrode TCE, the sensing connection electrode RCE, the driving electrodes TE and the sensing electrodes RE are disposed on one surface of the first substrate SUB1 facing the second substrate SUB2.

The driving connection electrode TCE is connected to the driving line TL and the driving electrodes TE. For example, the driving connection electrode TCE is connected to the driving line TL at one end in the longitudinal direction (Y-axis direction). The driving electrodes TE may be branched in the width direction (X-axis direction) of the driving connection electrode TCE.

The sensing connection electrode RCE is connected to one of the sensing lines RL1 to RL8 and the sensing electrodes RE. For example, the sensing connection electrode TCE is connected to one of the sensing lines RL1 to RL8 at one end in the longitudinal direction (Y-axis direction). The sensing electrodes RE may be branched in the width direction (X-axis direction) of the sensing connection electrode RCE.

The driving electrodes TE and the sensing electrodes RE are disposed adjacent to each other, but are not connected to each other. The driving electrodes TE and the sensing electrodes RE may be arranged in parallel with each other. The driving electrodes TE and the sensing electrodes RE may be alternately arranged in the longitudinal direction (Y-axis direction) of the driving connection electrode TCE and the sensing connection electrode RCE. For example, the driving electrode TE, the sensing electrode RE, the driving electrode TE and the sensing electrode RE may be sequentially and repeatedly arranged in the longitudinal direction (Y-axis direction) of the driving connection electrode TCE and the sensing connection electrode RCE.

The driving line TL, the sensing lines RL1 to RL8, the driving connection electrodes TCE, the sensing connection electrodes RCE, the driving electrodes TE and the sensing electrodes RE may be formed on the same layer. The driving line TL, the sensing lines RL1 to RL8, the driving, connection electrodes TCE, the sensing, connection electrodes RCE, the driving electrodes TE, and the sensing electrodes RE may be formed of the same material. For example, the driving line TL, the sensing lines RL1 to RL8, the driving connection electrodes TCE, the sensing connection electrodes RCE, the driving electrodes TE, and the sensing electrodes RE may each include a conductive material such as silver (Ag), copper (Cu) or the like. The driving line TL, the sensing lines RL1 to RL8, the driving connection electrodes TCE, the sensing connection electrodes RCE, the driving electrodes TE and the sensing electrodes RE may be formed on the first substrate SUB1 by a screen printing method.

The force sensitive layer PSL is disposed on one surface of the second substrate SUB2 facing the first substrate SUB1. The force sensitive layer PSL may be arranged to at least partially overlap the driving electrodes TE and the sensing electrodes RE.

The force sensitive layer PSL may include polymeric resin having a force sensitive material. The force sensitive material may be metal microparticles (or metal nanoparticles) such as nickel, aluminum, titanium, tin, copper or the like. For example, the force sensitive layer PSL may be a Quantum Tunneling Composite (QTC).

When the force in the height direction (Z-axis direction) of the first force sensor 510 is not applied to the second substrate SUB2, there is a gap between the force sensitive layer PSL and the driving electrodes TE and between the force sensitive layer PSL and the sensing electrodes RE. For example, when the force is not applied to the second substrate SUB2, the force sensitive layer PSL is spaced apart from the driving electrodes TE and the sensing electrodes RE.

When the force is applied to the second substrate SUB2 in the height direction (Z-axis direction) of the first force sensor 510, the force sensitive layer PSL may contact the driving electrodes TE and the sensing electrodes RE. In this case, at least one of the driving electrodes TE and at least one of the sensing electrodes RE, may be physically connected through the force sensitive layer PSL and the force sensitive layer PSL may act as an electrical resistance.

Figure 13:
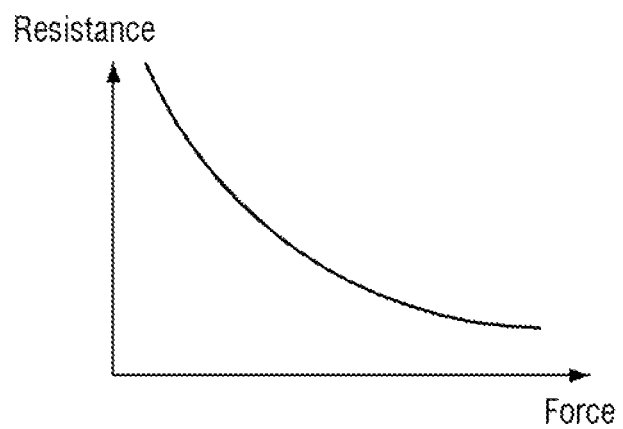
FIG. 13 is a graph illustrating an electrical resistance according to a force applied to a force sensitive layer.

Therefore, as shown in FIGS. 10 to 12, since the area of contact of the force sensitive layer PSL with the driving electrodes TE and the sensing electrodes RE varies depending on the force applied to the force sensitive cells of the first force sensor 510, the resistance value of the sensing line electrically connected to the sensing electrodes RE may be changed. For example, as shown in FIG. 13, as the force applied to the force sensitive cell of the first force sensor 510 is higher, the resistance value of the sensing line may be lower. The force sensing unit 330 detects a change in current value or voltage value from the sensing lines RL1 to RL8 according to the change in resistance value, thereby detecting the force pressed by the user's hand. Thus, the first force sensor 510 may be used as an input device for sensing a user's input.

Each of the driving electrodes TE may include driving protrusions TP as shown in FIG. 11. Each of the driving protrusions TP may protrude from the driving electrode TE in the width direction (Y-axis direction) of the driving electrode TE crossing the longitudinal direction (X-axis direction) of the driving electrode TE. Each of the driving protrusions TP may protrude from a side surface of the driving electrode TE facing the sensing electrodes RE. For example, since the driving electrodes TE and the sensing electrodes RE are alternately arranged in the longitudinal direction (Y-axis direction) of the driving connection electrode TCE and the sensing connection electrode RCE, the driving electrode TE is disposed between two side surfaces. Therefore, the driving protrusions TP may protrude from the two side surfaces of the driving electrode TE adjacent to two sensing electrodes RE.

Each of the sensing electrodes RE may include sensing protrusions RP as shown in FIG. 11. Each of the sensing protrusions RP may protrude from the sensing electrode RE in the width direction (Y-axis direction) of the sensing electrode RE crossing the longitudinal direction (X-axis direction) of the sensing electrode RE. Each of the sensing protrusions RP may protrude from a side surface of the sensing electrode RE facing the driving electrodes TE. For example, since the driving, electrodes TE and the sensing electrodes RE are alternately arranged in the longitudinal direction (Y-axis direction) of the driving connection electrode TCE and the sensing connection electrode RCE, the sensing electrodes RE is disposed between two side surfaces. Therefore, the sensing protrusions RP may protrude from two side surfaces of the sensing electrode RE adjacent to two driving electrodes TE.

Although FIG. 11 illustrates that the driving protrusions TP and the sensing protrusions RP are rectangular in a plan view, the planar shapes of the driving protrusions TP and the sensing protrusions RP are not limited thereto. For example, the driving protrusions TP and the sensing protrusions RP may be formed in a polygonal shape or a circular shape in a plan view. Although FIG. 11 illustrates that the driving protrusions TP and the sensing protrusions RP have the same shape, the exemplary embodiment of the present disclosure is not limited thereto. For example, the driving protrusions TP may have different shapes, and the sensing protrusions RP may have different shapes. Alternatively, the driving protrusions TP are identical to each other and the sensing protrusions RP are identical to each other, but the planar shape of each of the driving protrusions TP may be different from the planar shape of each of the sensing protrusions RP.

The driving protrusion TP may be disposed between the sensing protrusions RP in the longitudinal direction (X-axis direction) tithe driving electrode TE and the sensing electrode RE. Further, the driving protrusions TP and the sensing protrusions RP may be arranged alternately in the longitudinal direction (X-axis direction) of the driving electrode TE and the sensing electrode RE. For example, they may be repeatedly arranged in the order of the driving protrusion TP, the sensing protrusion RP, the driving protrusion TP, and the sensing protrusion RP in the longitudinal direction (X-axis direction) of the driving electrode TE and the sensing electrode RE.

The length in which the driving electrode TE and the sensing electrode RE face each other may increase due to the driving protrusions TP of each of the driving electrodes TE and the sensing protrusions RP of each of the sensing electrodes RE. Accordingly, the fringe capacitance and the lateral capacitance between the driving electrode TE and the sensing electrode RE may increase. For example, the capacitance between the driving electrode TE and the sensing electrode RE may increase.

The shape of the driving protrusions TP and the shape of the sensing protrusions RP are not limited to FIG. 11. For example, the one side of the driving electrodes TE may have a mirror-image symmetry with the one side of the sensing electrodes RE which faces the one side of the driving electrodes TE.

Figure 28:
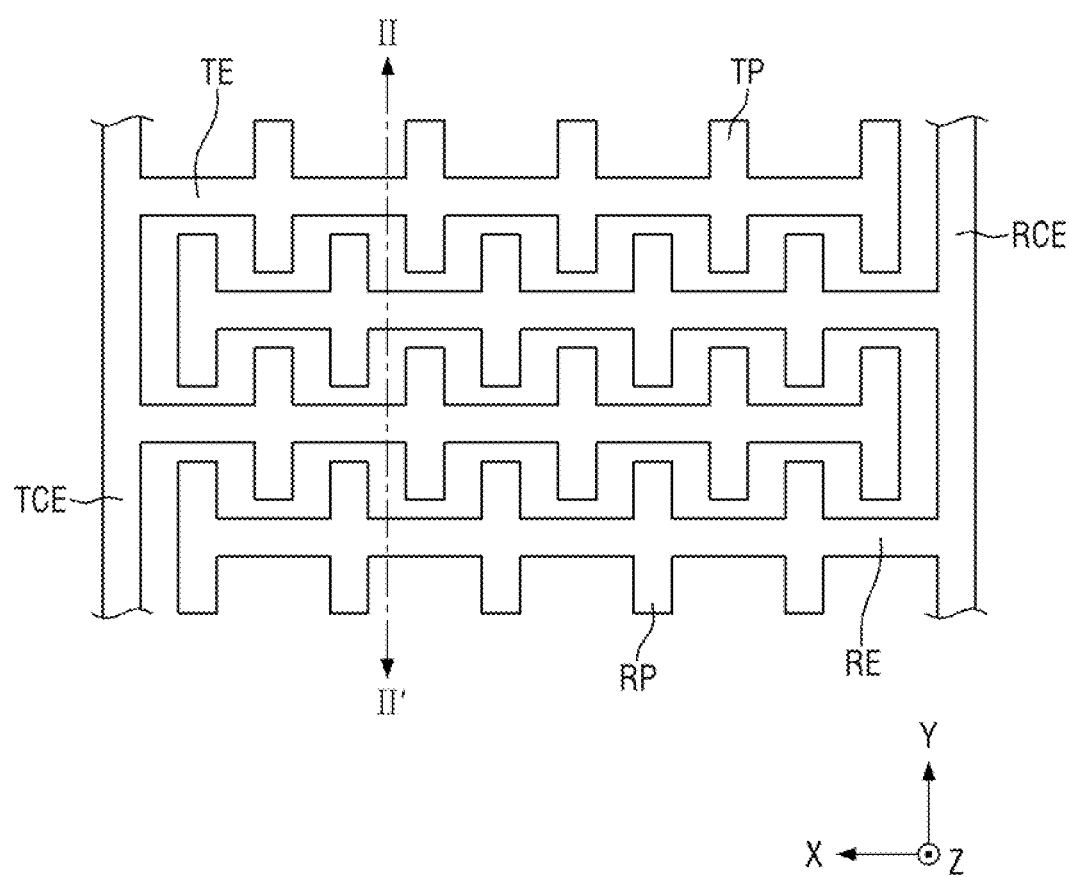
FIGS. 28 and 29 are an enlarged plan view illustrating an example of region A-1 of FIG. 10.

Further, referring to FIG. 28, the driving protrusions TP of driving electrodes TE may overlap the sensing protrusions RP of the sensing electrodes RE in the longitudinal direction (X-axis direction) to increase the length in which the driving electrode TE and the sensing electrode RE face each other.

After the first force sensor 510 is manufactured, a disconnection inspection may be performed to check whether the sensing electrodes RE, the driving line TL, the sensing lines RL1 to RL8, the driving connection electrodes TCE, the sensing connection electrodes RCEs, the driving electrodes TE, and/or the sensing electrodes RE are disconnected. The disconnection inspection may be performed by applying a predetermined voltage, for example, 5 V to 10 V, to the driving line TL to charge capacitances between the driving electrodes TE and the sensing electrodes RE and then detecting voltages charged in capacitances through sensing lines RL1 to RL8. When any one of the driving line TE, the sensing lines RL1 to RL8, the driving connection electrode TCE, the sensing connection electrode RCE, the driving electrodes TE, and/or the sensing electrodes RE is disconnected, at least one of the voltages sensed through the sensing lines RL1 to RL8 may be less than a threshold value. However, if there is a small difference between the voltage charged in the electrostatic capacitances between the driving electrodes TE and the sensing electrodes RE and the threshold value, the inspection result may be inaccurate.

As shown in FIG. 11, the length in which the driving electrode TE and the sensing electrode RE face each other may increase due to the driving protrusions TP of each of the driving electrodes TE and the sensing protrusions RP of each of the sensing electrodes RE. Accordingly, the capacitance between the driving electrode TE and the sensing electrode RE may increase. Since the difference between the threshold voltage and the voltage charged in the capacitances between the driving electrodes TE and the sensing electrodes RE may become large, an accurate inspection can be performed.

The adhesive layer AL may be disposed on the driving line TL and the sensing lines RL1 to RLp, as shown in FIG. 10. For example, the adhesive layer AL may cover the driving line TL and the sensing lines RL1 to RLp, thereby serving as an insulating layer which insulates the driving line TL and the sensing lines RL1 to RLp. Therefore, it is possible to prevent the driving line TL and the sensing lines RL1 to RLp from being exposed to the outside and oxidized. Even if the farce sensitive layer PSL of the second substrate SUB2 overlaps the driving line TL and the sensing lines RL1 to RLp of the first substrate SUB1 due to a process error, it is possible to prevent the driving line TL and the sensing lines RL1 to RLp of the first substrate SUB1 from contacting the force sensitive layer PSL of the second substrate SUB2 when the force is applied.

Figure 17:
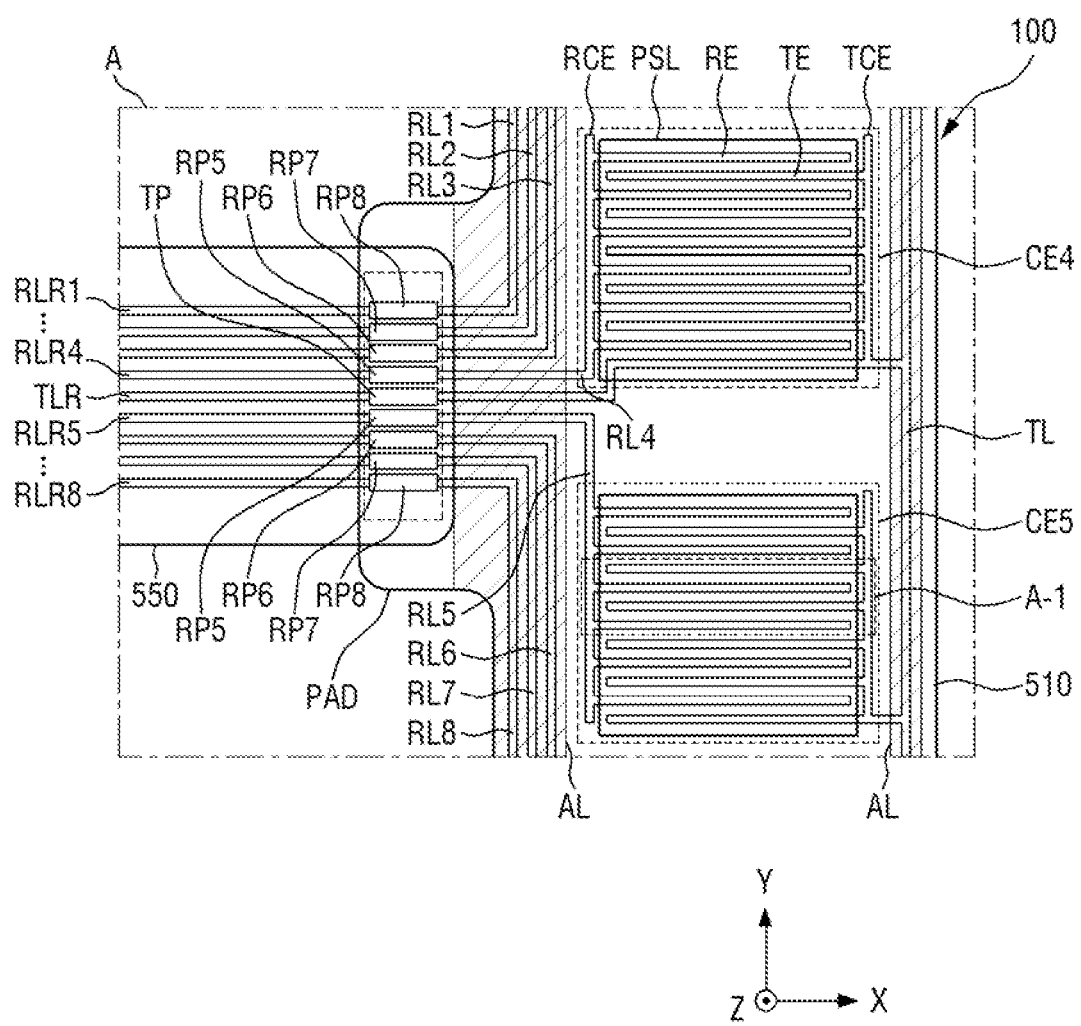
FIG. 17 is an enlarged plan view illustrating an example of region A of FIG. 9.
Figure 18:
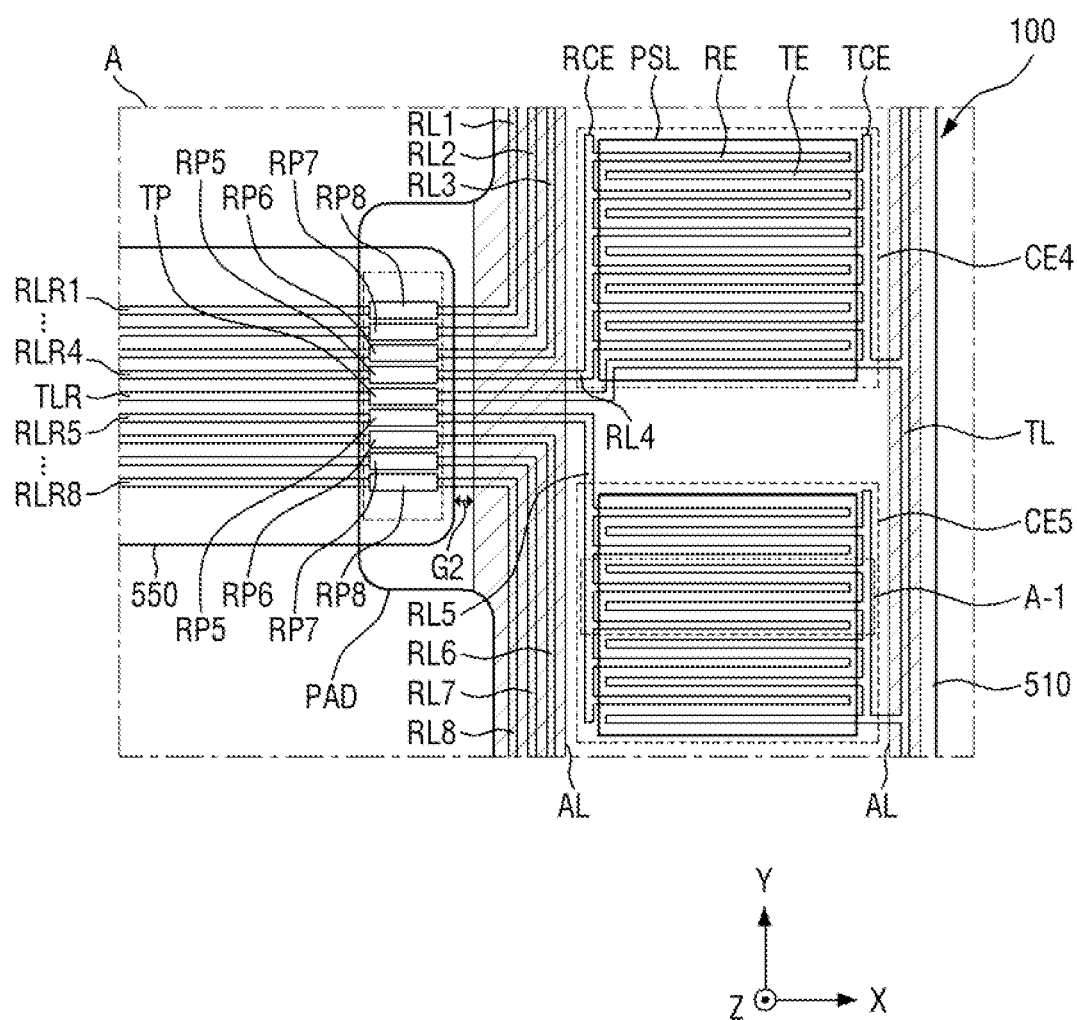
FIG. 18 is an enlarged plan view illustrating an example of region A of FIG. 9.

The adhesive layer AL might not be disposed on the driving line TL and the sensing lines RL1 to RLp arranged on the pad portion PAD as shown in FIG. 10. For example, a first gap G1 may exist between the adhesive layer AL and the force sensing circuit board 550, but the exemplary embodiment of the present disclosure is not limited thereto. For example, as shown in FIG. 17, the adhesive layer AL may be disposed on the driving line TL and the sensing lines RL1 to RLp disposed on the pad portion PAD. Accordingly, there may be no gap between the adhesive layer AL and the force sensing circuit board 550. In this case, the adhesive layer AL may contact the three sensitive circuit board 550. Further, as shown in FIG. 18, the adhesive layer AL may be disposed on the driving line TL and the sensing lines RL1 to RLp disposed on the pad portion PAD. In this case, however, a second gap G2 may be present between the adhesive layer AL and the force sensing circuit board 550. Since the gap G2 is smaller than the first gap G1, the area of the driving line TL and the sensing lines RL1 to RLp exposed to the outside can be minimized.

Further, the adhesive layer AL does not overlap the force sensitive cells CE1 to CE8 and the driving pad TPD and the sensing pads RP1 to RPp of the pad portion PAD as shown in FIG. 10. When the adhesive layer AL overlaps the force sensitive cells CE1 to CE8, the driving electrode TE and the sensing electrodes RE of the first substrate SUB1 cannot contact the force sensitive layer PSL of the second substrate SUB2, it is difficult to sense the force even if the force is applied. Further, when the adhesive layer AL overlaps the driving pad TPD and the sensing pads RP1 to RPp, the driving pad TPD and the sensing pads RP1 to RPp of the pad portion PAD cannot be connected to the force sensing circuit board 550. Therefore, the force sensitive cells CE1 to CE8 cannot receive the driving voltage from the force sensing circuit board 550 and the force sensing circuit board 550 cannot detect current values or voltage values from the force sensitive cells CE1 to CE8.

Meanwhile, since the second force sensor 520 is substantially the same as the first force sensor 510 described with reference to FIGS. 10 to 12, a detailed description of the second force sensor 520 will be omitted.

Figure 16:
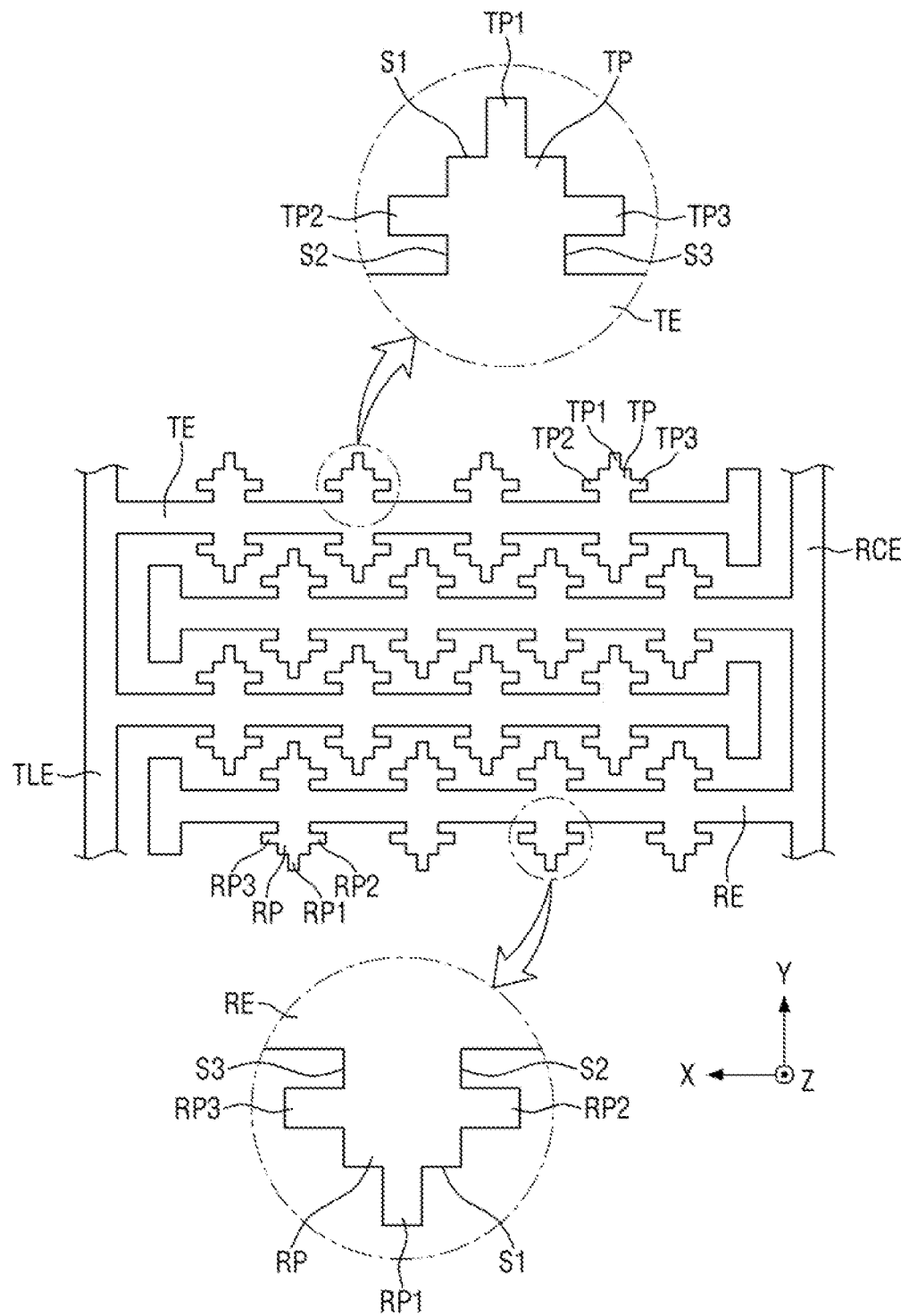
FIG. 16 is an enlarged plan view illustrating an example of region A-1 of FIG. 10.

FIG. 16 is an enlarged plan view showing an example of region A-1 of FIG. 10.

The arrangement of FIG. 16 is different from the arrangement of FIG. 11 in that each of the driving protrusions TP includes first to third driving protrusions TP1 to TP3 protruding therefrom, and each of the sensing protrusions RP has first to third sensing protrusions RP1 to RP3. Therefore, in FIG. 16, a description of comparable elements to what is shown in FIG. 11 will be omitted.

Referring to FIG. 16, each of the driving electrodes TE may further include a first driving protrusion TP1, a second driving protrusion TP2 and a third driving protrusion TP3 protruding from each driving protrusion TP. The first driving protrusion TP1 may protrude from a first side surface S1 of each driving protrusion TP, the second driving protrusion TP2 may protrude from a second side surface S2 of each driving protrusion TP, and the third driving protrusion TP3 may protrude from a third side surface S3 of each driving protrusion TP. The second side surface S2 and the third side surface S3 of each driving protrusion TP may be arranged to face each other. For example, the first driving protrusion TP1 may protrude from each driving protrusion TP in the width direction (Y-axis direction) of the driving electrode TE. The second driving protrusion TP2 and the third driving protrusion TP3 may protrude from each driving protrusion TP in the longitudinal direction (X-axis direction) of the driving electrode TE.

The size of each of the first driving protrusion TP1, the second driving protrusion TP2 and the third driving protrusion TP3 may be smaller than the size of the driving protrusion TP1. In FIG. 16, it is illustrated that the first driving protrusion TP1, the second driving protrusion TP2 and the third driving protrusion TP3 are rectangular in a plan view. However, the planar shapes of the first driving protrusion TP1, the second driving protrusion TP2 and third driving protrusion TP3 are not limited thereto. For example, the first driving protrusion TP1, the second driving protrusion TP2, and the third driving protrusion TP3 may each be formed in a polygonal or circular shape in a plan view. Further, it is illustrated in FIG. 16 that the first driving protrusion TP1, the second driving protrusion TP2, and the third driving protrusion TP3 have the same shape, but the exemplary embodiment of the present disclosure is not limited thereto. For example, the first driving protrusion TP1, the second driving protrusion TP2 and the third driving protrusion TP3 may have different shapes from each other. Alternatively, two of the first thriving protrusion TP1, the second driving protrusion TP2 and the third driving protrusion TP3 may have the same shape, and the other one may have another shape.

Each of the sensing electrodes RE may further include a first sensing protrusion RP1, a second sensing protrusion RP2 and a third sensing protrusion RP3 protruding from each sensing protrusion RP. The first sensing protrusion RP1 may protrude from a first side surface S1 of each sensing protrusion RP, the second sensing protrusion RP2 may protrude from a second side surface S2 of each sensing protrusion RP, and the third sensing protrusion RP3 may protrude from a third side surface S3 of each sensing protrusion RP. The second side surface S2 and the third side surface S3 of each sensing protrusion RP may be arranged to face each other. For example, the first sensing protrusion RP1 may protrude from each sensing protrusion RP in the width direction (Y-axis direction) of the sensing electrode RE. The second sensing protrusion RP2 and the third sensing protrusion RP3 may protrude from each sensing protrusion RP in the longitudinal direction (X-axis direction) of the sensing electrode RE.

The size of each of the first sensing protrusion RP1 the second sensing protrusion RP2 and the third sensing protrusion RP3 may be smaller than the size of the sensing protrusion RP. In FIG. 16, it is illustrated that the first sensing protrusion RP1, the second sensing protrusion RP2 and the third sensing protrusion RP3 are rectangular in a plan view. However, the planar shapes of the first sensing protrusion RP1, the second sensing protrusion RP2 and the third sensing protrusion RP3 are not limited thereto. For example, the first sensing protrusion RP1, the second sensing protrusion RP2 and the third sensing protrusion RP3 may each be formed in a polygonal or circular shape in a plan view. Further, it is illustrated in FIG. 16 that the first sensing protrusion RP1, the second sensing protrusion RP2 and the third sensing protrusion RP3 have the same shape, but the exemplary embodiment of the present disclosure is not limited thereto. For example, the first sensing protrusion RP1, the second sensing protrusion RP2 and the third sensing protrusion RP3 may have different shapes. Alternatively, two of the first sensing protrusion RP1, the second sensing protrusion RP2 and the third sensing protrusion RP3 may have the same shape, and the other one may have another shape.

Each of the driving protrusions TP of each of the driving electrodes TE includes the first driving protrusion TP1, the second driving protrusion TP2 and the third driving protrusion TP3, and each of the sensing protrusions RP of each of the sensing electrodes RE includes the first sensing protrusion RP1, the second sensing protrusion RP2 and the third sensing protrusion RP3, so that the length in which the driving electrode TE and the sensing electrode RE face each other can be increased. Thus, the fringe capacitance and the lateral capacitance between the driving electrode TE and the sensing electrode RE can be increased. For example, the capacitance between the driving electrode TE and the sensing electrode RE can be increased.

As shown in FIG. 16, each of the driving protrusions TP of each of the driving electrodes TE includes the first driving protrusion TP1, the second driving protrusion TP2 and the third driving protrusion TP3, and each of the sensing protrusions RP of each of the sensing electrodes RE includes the first sensing, protrusion RP1, the second sensing protrusion RP2 and the third sensing protrusion RP3. Accordingly, the length in which the driving electrode TE and the sensing electrode RE face each other may increase. Thus, the capacitance between the driving electrode TE and the sensing electrode RE may increase. Therefore, since the difference between the threshold voltage and the voltage charged in the capacitances between the driving electrodes TE and the sensing electrodes RE may become large, an accurate inspection can be performed.

Figure 29:
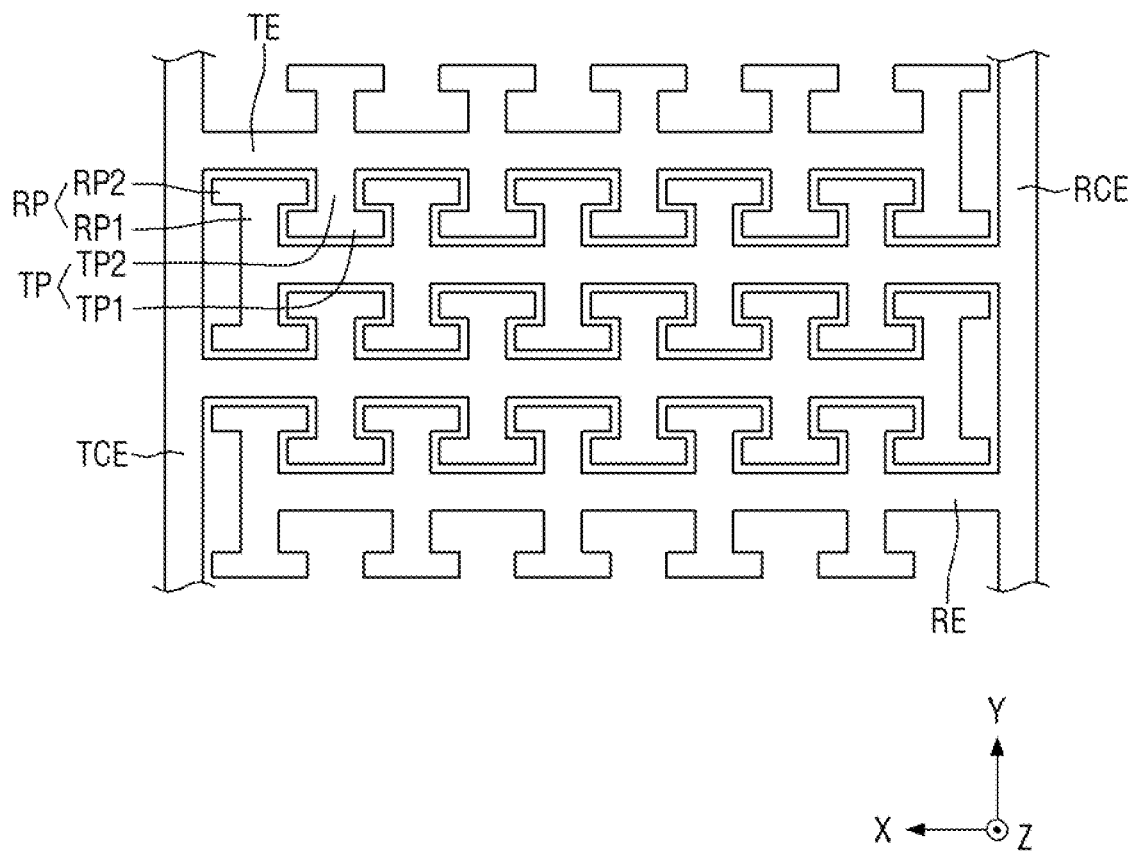

Further, as shown in FIG. 29, each of the driving protrusions TP of each of the driving electrodes TE includes the first driving protrusion TP1 and the second driving protrusion TP2. The first driving protrusion TP1 may protrude from the driving electrode TE in the width direction (Y-axis direction) of the driving electrode TE. The first driving protrusion TP1 may extend in the width direction (Y-axis direction) of the driving electrode TE. The second driving protrusion TP2 may protrude from the first driving protrusion TP1 in the longitudinal direction (X-axis direction) of the driving electrode TE. The first driving protrusion TP1 may extend in the width direction (Y-axis direction) of the driving electrode TE. The second driving protrusion TP2 may extend in the longitudinal direction (X-axis direction) of the driving electrode TE.

Each of the sensing protrusions RP of each of the sensing electrodes RE includes the first sensing protrusion RP1 and the second sensing protrusion RP2. The first sensing protrusion RP1 may protrude from the sensing electrode RE in the width direction (Y-axis direction) of the sensing electrode RE. The first sensing protrusion RP1 may extend in the width direction (Y-axis direction) of the sensing electrode RE. The second sensing protrusion RP2 may protrude from the first sensing protrusion RP1 in the longitudinal direction (X-axis direction) of the sensing electrode RE. The first sensing protrusion RP1 may extend in the width direction (Y-axis direction) of the sensing electrode RE. The second sensing protrusion RP2 may extend TP1 in the longitudinal direction (X-axis direction) of the sensing electrode RE.

The first driving protrusion TP1 of the driving electrodes TE may overlap the first sensing driving protrusion RP1 of the sensing electrode RE in the longitudinal direction (X-axis direction) of the driving electrode TE to increase the length in which the driving electrode TE and the sensing electrode RE face each other. Also, the second driving protrusion TP2 of the driving electrodes TE may overlap the second sensing driving protrusion RP2 of the sensing electrode RE in the width direction (Y-axis direction) of the driving electrode TE to increase the length in which the driving electrode TE and the sensing electrode RE face each other.

Meanwhile, the shape of the driving protrusions TP and the shape of the sensing protrusions RP are not limited to FIGS. 16 and 29. For example, the one side of the driving electrodes TE may have a mirror-image symmetry with the one side of the sensing electrodes RE which faces the one side of the driving electrodes TE.

Figure 19:
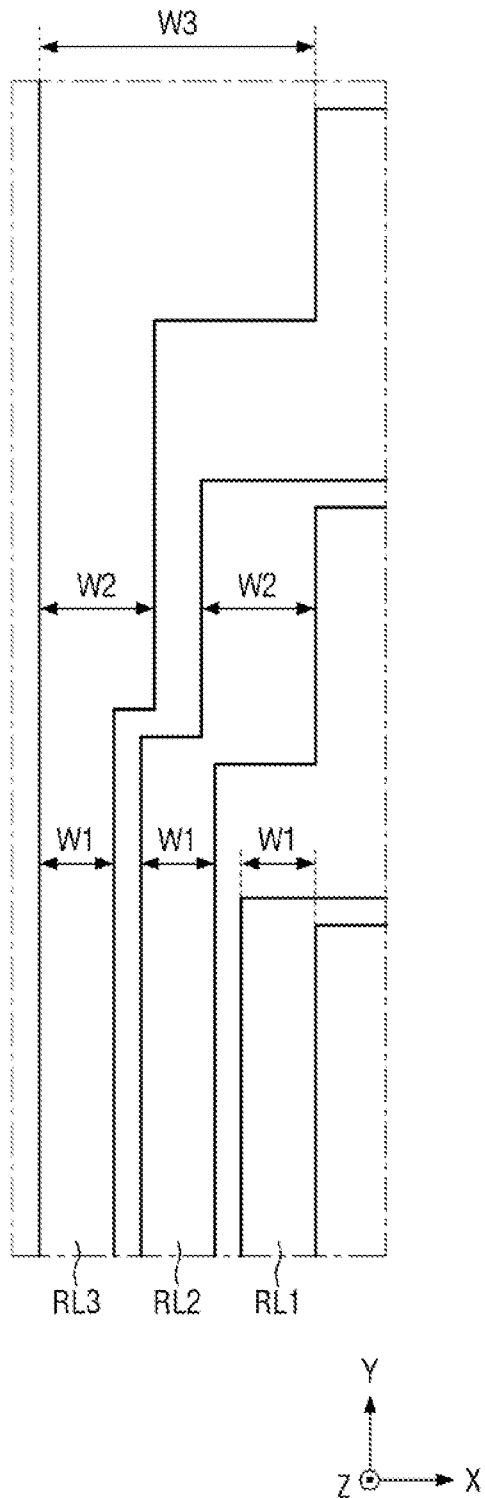
FIG. 19 is an enlarged plan view illustrating an example of region B of FIG. 9.

FIG. 19 is an enlarged plan view showing an example of region B of FIG. 9. FIG. 20 is an enlarged plan view showing an example of region C of FIG. 9.

Referring to FIG. 19 among the first to third sensing lines RL1 to RL3, the first sensing line RL1 may be disposed at the outermost position, and the third sensing line RL3 may be disposed at the innermost position. Since the third sensing line RL3 is connected to the third force sensitive cell CE3 disposed closest to the pad portion PAD, the wiring length is the shortest. In contrast, since the first sensing line RL1 is connected to the first force sensitive cell CE1 arranged farthest from the pad portion PAD, the wiring length is the longest. For example, the wiring length of the first sensing line RL1, the wiring length of the second sensing line RL2 and the wiring length of the third sensing line RL3 may be different from each other. Therefore, the wiring resistance of the first sensing line RL1, the wiring resistance of the second sensing line RL2, and the wiring resistance of the third sensing line RL3 may be different from each other.

Thus, in order to minimize the difference between the wiring resistance of the first sensing line RL1, the wiring resistance of the second sensing line RL2 and the wiring resistance of the third sensing line RL3, the wiring width of the sensing line can be designed to increase as the number of sensing lines decreases. For example, the first sensing line RL1, the second sensing line RL2 and the third sensing line RL3 are disposed on the outside of one side of the third force sensitive cell CE3. However, since the third sensing line RL3 is connected to the third force sensitive cell CE3, on the outside of one side of the second force sensitive cell CE2, only the first sensing line RL1 and the second sensing line RL2 are disposed. Therefore, the first sensing line RL1, the second sensing line RL2 and the third sensing line RL3 disposed on the outside of one side of the third force sensitive cell CE3 have a first width W1 while the first sensing line RL1 and the second sensing line RL2 disposed on the outside of one side of the second force sensitive cell CE2 may have a second width W2 larger than the first width W1.

The second sensing line RL2 is connected to the first force sensitive cell CE1, and accordingly, only the first sensing line RL1 is disposed on the outside of one side of the first force sensing cell CE1. Therefore, the first sensing line RL1 and the second sensing line RL2 disposed on the outside of one side of the second force sensitive cell CE2 have a second width W2 while the first sensing line RL1 disposed on the outside of one side of the first sensing line CE1 may have a third width W3 that is larger than the second width W2.

Further, since only one driving line is disposed on the outside of the other side of the first to third force sensitive cells CE1 to CE3, the width of the driving line may be equal to or greater than the third width W3.

Referring to FIG. 20, among the sixth to eighth sensing lines RL6 to RL8, the eighth sensing line RL8 may be disposed at the outermost position and the sixth sensing line RL6 may be disposed at the innermost position. Since the sixth sensing line RL6 is connected to the sixth force sensitive cell CE6 disposed closest to the pad portion PAD, the wiring length is the shortest. In contrast, since the eighth sensing line RL8 is connected to the eighth force sensitive cell CE8 arranged farthest from the pad portion PAD, the wiring length is the longest. For example, the wiring length of the sixth sensing line RL6, the wiring length of the seventh sensing line RL7 and the wiring length of the eighth sensing line RL8 may be different. Therefore, the wiring resistance of the sixth sensing line RL6, the wiring resistance of the seventh sensing line RL7 and the wiring resistance of the eighth sensing line RL8 may be different from each other. Thus, in order to minimize the difference between the wiring resistance of the sixth sensing line RL6, the wiring resistance of the seventh sensing line RL7 and the wiring resistance of the eighth sensing line RL8, the wiring width of the sensing line can be designed to increase as the number of sensing lines decreases.

For example, the sixth sensing line RL6, the seventh sensing line RL7 and the eighth sensing line RL8 are disposed on the outside of one side of the sixth force sensitive cell CE6. However, since the sixth sensing line RL6 is connected to the sixth sensitive cell CE6, only the seventh sensing line RL7 and the eighth sensing line RL8 are disposed on the outside of one side of the seventh force sensitive cell CE7. Therefore, the sixth sensing line RL, the seventh sensing line RL7 and the eighth sensing line RL8 disposed on the outside of one side of the sixth force sensing cell CE6 have a fourth width W4 while the seventh sensing line RL7 and the eighth sensing line RL8 disposed on the outside of one side of the seventh force sensitive cell CE7 may have a fifth width W5 larger than the fourth width W4. The fourth width W4 may be substantially the same as the first width W1 and the fifth width W5 may be substantially the same as the second width W2.

Meanwhile, although FIGS. 19 and 20 illustrate that the same number of sensing lines are arranged in the regions B and C, the exemplary embodiment of the present disclosure is not limited thereto. For example, a different number of sensing lines may be arranged in the regions B and C. In this case, the fourth width W4 may be different from the first width W1, and the fifth width W5 may be different from the second width W2. For example, when the number of sensing lines arranged in the region C is larger than the number of sensing lines arranged in the region B, the fourth width W4 may be smaller than the first width W1, the fifth width W5 may be smaller than the second width W2.

As shown in FIGS. 19 and 20, the wiring width of the sensing lines are designed to increase as the number of sensing lines decreases, thereby minimizing the difference between the wiring resistances of the sensing lines RL1 to RL8.

Figure 21:
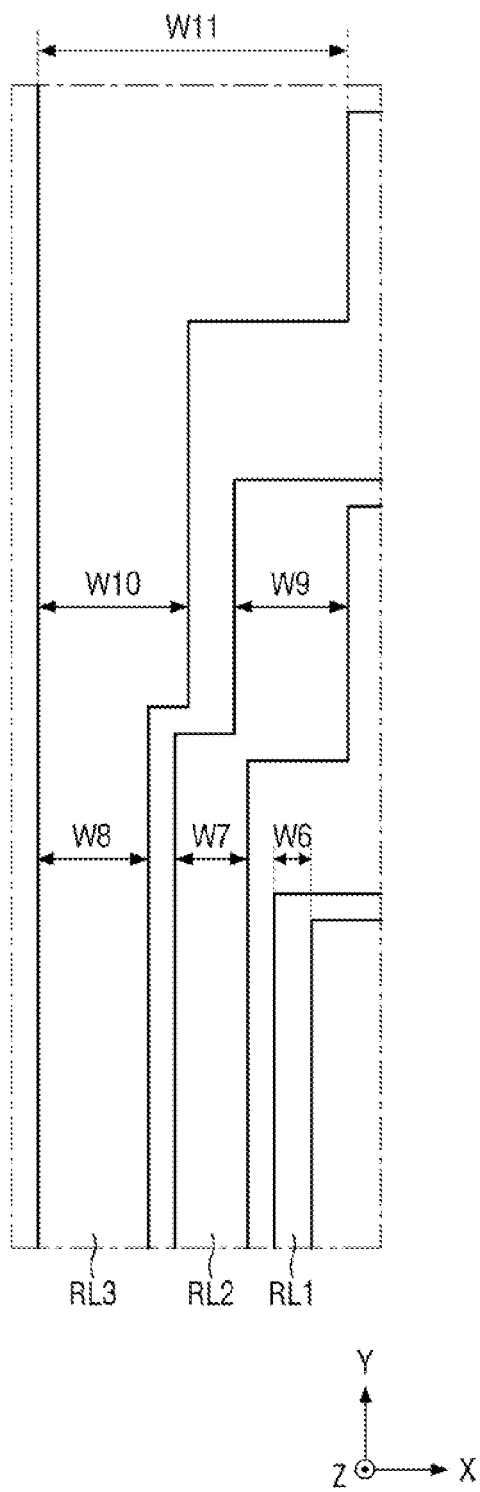
FIG. 21 is an enlarged plan view illustrating an example of the region B of FIG. 9.
Figure 22:
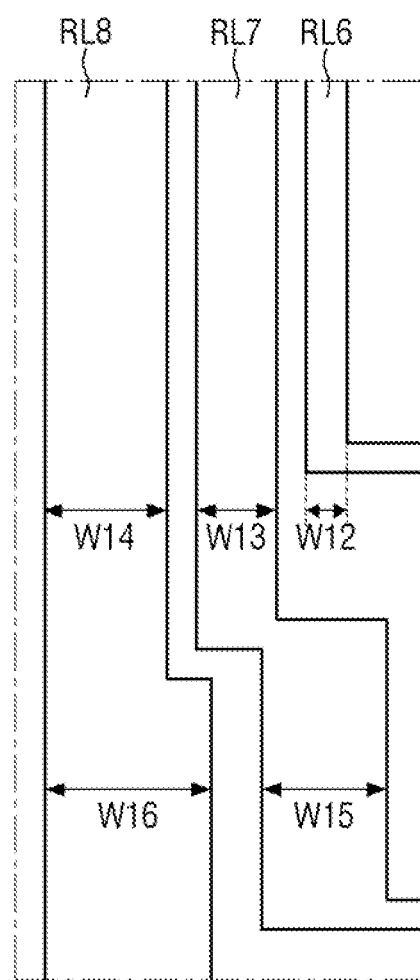
FIG. 22 is an enlarged plan view illustrating an example of the region C of FIG. 9.

FIG. 21 is an enlarged plan view showing an example of the region B of FIG. 9. FIG. 22 is an enlarged plan view showing an example of the region C of FIG. 9.

The arrangement shown in FIGS. 21 and 22 is different from the arrangement shown in FIGS. 19 and 20 in that the wiring widths are designed differentially according to the wiring lengths of the first to third sensing lines RL1 to RL3 and the wiring widths are designed differentially according to the wiring lengths of the sixth to eighth sensing lines RL6 to RL8. Therefore, in FIGS. 21 and 22, a description overlapping with the arrangement shown in FIGS. 19 and 20 will be omitted.

Referring to FIG. 21, the first sensing line RL1, the second sensing line RL2 and the third sensing line RL3 are disposed on the outside of one side of the third force sensitive cell CE3. The wiring length of the third sensing line RL3 may be the shortest, the wiring length of the first sensing line RL1 may be the longest, and the wiring length of the second sensing line RL2 may be longer than the wiring length of the first sensing line RL1 and may also be longer than the wiring length of the third sensing line RL3.

Thus, in order to minimize the difference between the wiring resistance of the first sensing line RL1, the wiring resistance of the second sensing line RL2 and the wiring resistance of the third sensing line RL3, the wiring width of the sensing line can be designed differently depending on the length of the sensing line. For example, the wiring width of the third sensing line RL3 disposed on the outside of one side of the third force sensitive cell CE3 may have a sixth width W6. The wiring width of the second sensing line RL2 disposed on the outside of one side of the third force sensitive cell CE3 may have a seventh width W7 larger than the sixth width W6. The wiring width of the first sensing line RL1 disposed on the outside of one side of the third force sensitive cell CE3 may have an eighth width W8 larger than the seventh width W7.

Further, since the third sensing line RL3 is connected to the third force sensitive cell CE3, only the first sensing line RL1 and the second sensing line RL2 are disposed on the outside of one side of the second force sensitive cell CE2. The wiring width of the second sensing line RL2 disposed on the outside of one side of the second force sensitive cell CE2 may have a ninth width W9 larger than the seventh width W7. The wiring width of the first sensing line RL1 disposed on the outside of one side of the second force sensitive cell CE2 may have a tenth width W10 larger than the eighth width W8.

Also, since the second sensing line RL2 is connected to the second force sensitive cell CE2, only the first sensing line RL1 is disposed on the outside of one side of the first force sensing cell CE1. The wiring width of the first sensing line RL1 disposed on the outside of one side of the first force sensitive cell CE1 may have an eleventh width W11 greater than the tenth width W10.

Further, since only one driving line TL is disposed on the outside of the other side of the first to third force sensitive cells CE1 to CE3, the width of the driving line TL may be equal to or greater than the tenth width W10.

Referring to FIG. 22, the sixth sensing line RL6, the seventh sensing line RL7 and the eighth sensing line RL8 are disposed on the outside of one side of the sixth force sensitive cell CE6. The wiring length of the sixth sensing line RL6 may be the shortest, the wiring length of the eighth sensing line RL8 may be the longest, and the wiring length of the seventh sensing line RL7 may be shorter than the wiring length of the eighth sensing line RL8 and may also be longer than the wiring length of the sixth sensing line RL6.

Thus, in order to minimize the difference between the wiring resistance of the sixth sensing line RL6 the wiring resistance of the seventh sensing line RL7, and the wiring resistance of the eighth sensing line RL8, the wiring width of the sensing line can be designed differently depending on the length of the sensing line. For example, the wiring width of the sixth sensing line RL6 disposed on the outside of one side of the sixth force sensitive cell CE6 may have a twelfth width W12. The wiring width of the seventh sensing line RL7 disposed on the outside of one side of the sixth force sensitive cell CE6 way have a thirteenth width W13 larger than the twelfth width W12. The wiring width of the eighth sensing line RL8 disposed on the outside of one side of the sixth force sensitive cell CE6 may have a fourteenth width W14 larger than the thirteenth width W13. The twelfth width W12 may be substantially the same as the sixth width W6, the thirteenth width W13 may be substantially the same as the seventh width W7, and the fourteenth width W14 may be substantially the same as the eighth width W8.

Meanwhile, although FIGS. 21 and 22 illustrate that the same number of sensing lines are arranged in the regions B and C, the exemplary embodiment of the present disclosure is not limited thereto. For example, a different number of sensing lines may be arranged in the regions B and C. In this case, the twelfth width W12 may be different from the sixth width W6, the thirteenth width W13 may be different from the seventh width W7, and the fourteenth width W14 may be different from the eighth width W8. For example, when the number of sensing lines arranged in the region C is larger than the number of sensing lines arranged in the region B the twelfth width W12 may be smaller than the sixth width W6, the thirteenth width W13 may be smaller than the seventh width W7 and the fourteenth width W14 may be smaller than the eighth width W8.

As shown in FIGS. 21 and 22, by designing the wiring widths differentially according to the wiring lengths of the sensing lines RL1 to RL8, it is possible to minimize the difference between the wiring resistances of the sensing lines RL1 to RL8.

Figure 23:
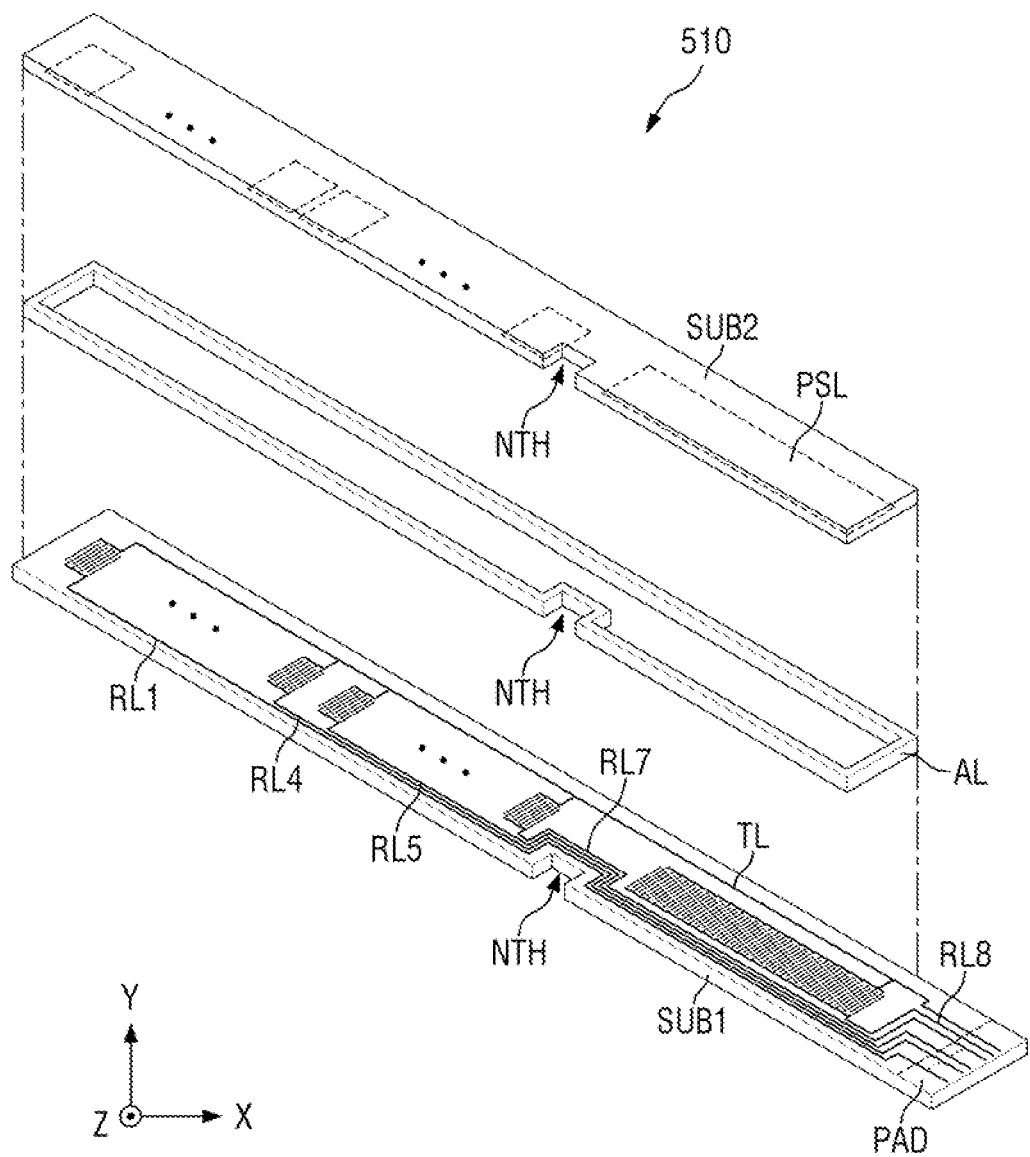
FIG. 23 is an exploded perspective view illustrating a force sensor according to an exemplary embodiment of the present inventive concept.
Figure 24:
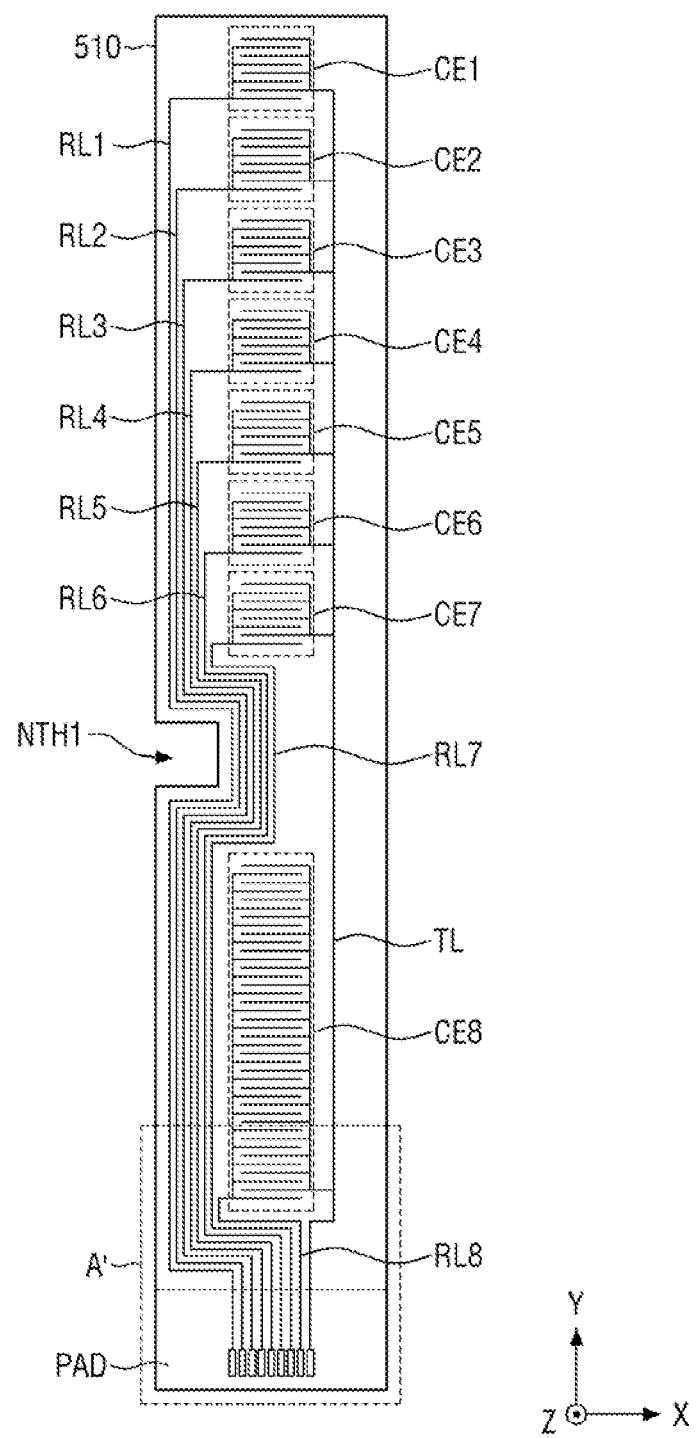
FIG. 24 is a plan view illustrating a force sensor according to an exemplary embodiment of the present inventive concept.
Figure 25:
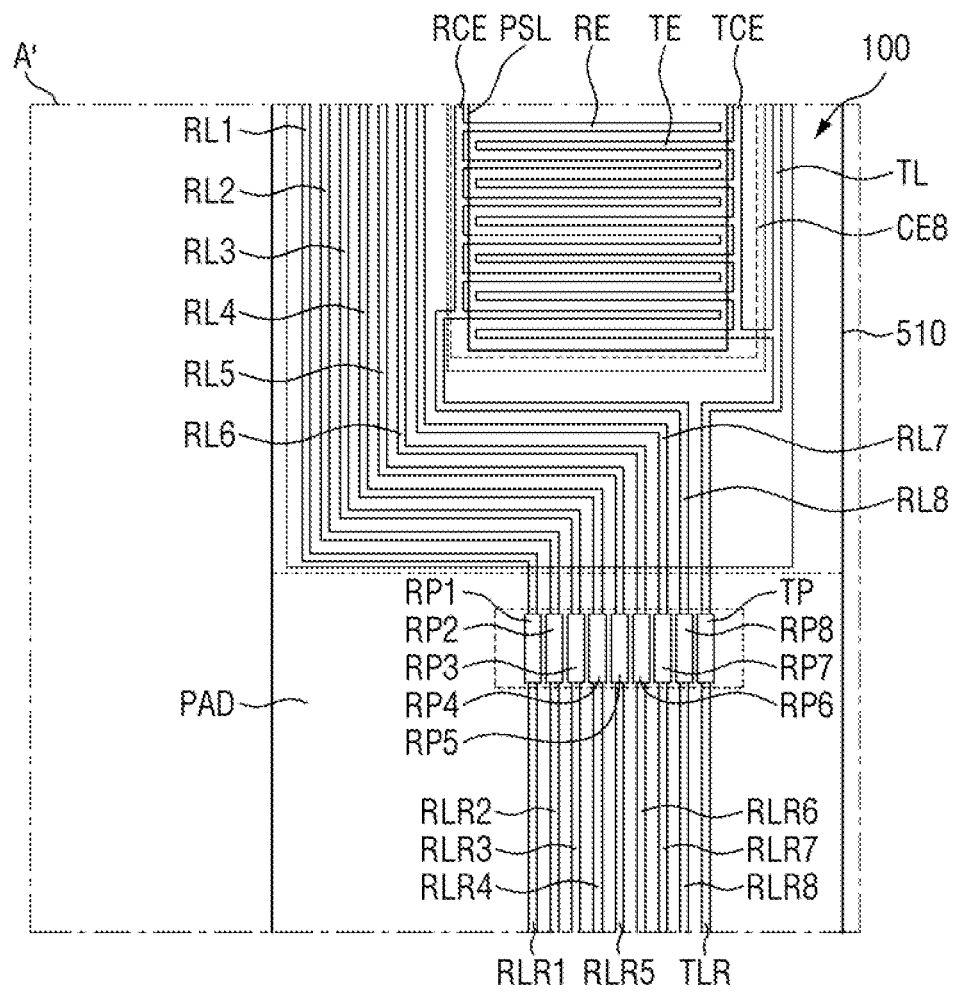
FIG. 25 is an enlarged plan view illustrating an example of region A' of FIG. 24.

FIG. 23 is an exploded perspective view showing a tierce sensor according to an exempla embodiment of the present inventive concept FIG. 24 is a plan view showing a force sensor according to another exemplary embodiment of the present inventive concept. FIG. 25 is an enlarged plan view showing an example of region A' of FIG. 24.

The arrangement shown in FIGS. 23 to 25 may be different from the arrangement shown in FIGS. 8 to 10 in that the pad portion PAD protrudes from one side surface corresponding to the short side of the first substrate SUB1. Therefore, in FIGS. 23 to 25, a description overlapping with the arrangement shown in FIGS. 8 to 10 will be omitted.

Referring to FIGS. 23 to 25, the pad portion PAD may protrude from one side surface corresponding to a short side of the first substrate SUB1. For example, the pad portion PAD may protrude from the lower surface of the first substrate SUB1 disposed below the eighth force sensitive cell CE8. In this case, the sensing lines RL1 to RL8 may be disposed on the outside of one side of the force sensitive cells CE1 to CE8 and the driving line TL may be disposed on the outside of the other side of the force sensitive cells CE1 to CE8.

FIGS. 26 and 27 show an example of a display device which utilizes first and second force sensors as a physical button according to an exemplary embodiment of the present inventive concept.

FIGS. 26 and 27 illustrate the first force sensor 510 disposed in the second region DR2 of the display device 10 and the first to eighth force sensitive cells CE1 to CE8 of the second force sensor 520. FIG. 26 illustrates that the user presses the fifth force sensitive cell CE5 of a left curved portion corresponding to the second region DR2 of the display device 10 with an index linger while holding the display device 10 with the hand. FIG. 27 illustrates that the user squeezes the eighth force sensitive cell CE8 of the left curved portion corresponding to the second region DR2 of the display device 10 with middle, ring and little fingers, and squeezes the eighth force sensitive cell CE8 of the left curved portion corresponding to the second region DR2 of the display device 10 with the palm of the hand while holding the display device 10 with the hand.

Referring to FIGS. 26 and 27, the first force sensor 510 and the second force sensor 520 may be replaced with a physical button of the display device 10. For example, when a force is applied to the first to eighth force sensitive cells CE1 to CE8 of the first force sensor 510 formed on the right curved portion of the display device 10 and the first to eighth force sensitive cells CE1 to CE8 of the second force sensor 520 formed on the left curved portion of the display device 10, a predetermined application or operation can be performed.

For example, among the first to eighth force sensitive cells CE1 to CE8 of the first force sensor 510 formed on the right curved portion of the display device 10, the first force sensitive cell CE1 and the second force sensing cell CE2 may be utilized as an acoustic upward button VB+ which the user presses to increase the sound of the display device 10, the third force sensitive cell CE3 and the fourth force sensitive cell CE4 may be utilized as a sound down button VB− which the user presses to lower the sound of the display device 10, and the fifth force sensitive cell CE5, the sixth force sensitive cell CE6 and the seventh force sensitive cell CE7 may be utilized as a power button PWB which the user presses to turn off the power.

The main processor 710 may increase the sound level of the speaker of the display device 10 when a force is detected via the first force sensitive cell CE1 and the second force sensitive cell CE2 formed on the right curved portion of the display device 10. Further, the main processor 710 may increase the sound level of the speaker of the display device 10 when a force is detected via the third force sensitive cell CE3 and the fourth force sensitive cell CE4 formed on the right curved portion of the display device 10. Further, the main processor 710 may turn off the screen of the display device 10 or output a screen for selecting the power-off of the display device 10 when a force is detected via the fifth force sensitive cell CE5, the sixth force sensitive cell CE6 and the seventh force sensitive cell CE7 formed on the right curved portion of the display device 10.

Further, among the first to eighth force sensitive cells CE1 to CE8 formed on the left curved portion of the display device 10, the first force sensitive cell CE1 and the second force sensing cell CE2 may be utilized as a call button CB which the user presses to execute a call application, the third force sensitive cell CE3 and the fourth force sensitive cell CE4 may be utilized as a camera button CMB which the user presses to execute a camera application, and the fifth force sensitive cell CE5, the sixth force sensitive cell CE6 and the seventh force sensitive cell CE7 may be utilized an Internet button IB which the user presses to execute an Internet application.

In this case, the main processor 710 may execute the call application when a force is detected via the first force sensitive cell CE1 and the second force sensitive cell CE2 formed on the left curved portion of the display device 10. Further, the main processor 710 may execute the camera application when a force is detected via the third force sensitive cell CE3 and the fourth force sensitive cell CE4 formed on the left curved portion of the display device 10. Further, the main processor 710 may execute the Internet application when a force is detected via the fifth force sensitive cell CE5, the sixth farce sensitive cell CE6 and the seventh force sensitive cell CE7 formed on the left curved portion of the display device 10.

The arrangement shown in FIG. 26 is merely an example, and the present disclosure is not limited thereto. For example, various functions including or excluding the above functions can be executed according to the application of the force to the first to seventh force sensitive cells CE1 to CE7 of the first force sensor 510 located on the right curved portion of the display device 10 and the first to seventh force sensitive cells CE1 to CE7 of the second force sensor 520 located on the left curved portion of the display device 10. Further, the main processor 710 may be programmed to perform a different operation for each of the first to seventh force sensitive cells CE1 to CE7 of the first force sensor 510 located on the right curved portion of the display device 10 and the first to seventh force sensitive cells CE1 to CE7 of the second force sensor 520 located on the left curved portion of the display device 10, may be programmed to perform different operations for each of the first to seventh force sensitive cells CE1 to CE7 of the force sensor 520.

Further, the eighth force sensitive cell CE8 formed on each of the left curved portion and the right curved portion of the display device 10 may be utilized as a squeeze sensing button SB. The squeeze force applied to the eighth force sensitive cell CE8 may be greater than the force applied to the first to seventh force sensitive cells CE1 to CE7. The main processor 710 may execute a predetermined application or operation when a squeeze force is detected via the eighth force sensitive cell CE8 formed on each of the left curved portion and the right curved portion. For example, the main processor 710 may turn on the display device 10 from a sleep mode when a squeeze force is detected via the eighth force sensitive cell CE8 formed on each of the left curved portion and the right curved portion.

As shown in FIGS. 26 and 27, by disposing the first force sensor 510 and the second force sensor 520 in the second regions DR2 corresponding to the curved portion of the display device 10, they may be utilized as a physical button such as a sound control button, a power button, a call button, a camera button, an Internet button, and a squeeze sensing button.

Further, when a force is applied to the first force sensor 510 and the second force sensor 520, the vibration generator 901 can be controlled to vibrate. In this case, the vibration of the vibration generator 901, when a force is applied to the first force sensor 510, may be different from the vibration of the vibration generator 901, when a force is applied to the second force sensor 520. Further, the vibration of the vibration generator 901 may be different depending on which position of the first to eighth force sensitive cells CE1 to CE8 of the first force sensor 510 and the first to eighth force sensitive cells CE1 to CE8 of the second force sensor 520 a force is applied to. The vibration of the vibration generator 901 can be adjusted by adjusting a vibration frequency, vibration displacement, and/or vibration period of the vibration generator 901.

As shown in FIGS. 26 and 27, the vibration generator 901 is configured to vibrate when a force is detected by the first to eighth force sensitive cells CE1 to CE8 of the first force sensor 510 and the first to eighth force sensitive cells CE1 to CE8 of the second force sensor 520, thereby providing the user with various tactile senses (e.g., haptics).

What is claimed is:

1. A sensor, comprising:
   a first substrate;
   a plurality of sensing cells disposed ort a first surface of the first substrate;
   a plurality of driving electrodes and a plurality of sensing electrodes respectively facing each other in each of the plurality of sensing cells; and
   a plurality of sensing lines respectively connecting the plurality of sensing electrodes to a plurality of sensing pads,
   wherein a maximum width of a first sensing line among the plurality of sensing lines is different from a maximum width of a second sensing line among the plurality of sensing lines, and
   wherein the maximum width of the first sensing line is dependent upon a length of the first sensing line and the maximum width of the second sensing line is dependent upon a length of the second sensing line.

2. The sensor of claim 1, wherein the first sensing line is connected to the plurality of sensing electrodes of a first sensing cell among the plurality of sensing cells, and wherein a second sensing line is connected to the plurality of sensing electrodes of a second sensing cell among the plurality of sensing cells.

3. The sensor of claim 2, wherein the second sensing line longer than the first sensing line.

4. The sensor of claim 2, wherein a width of the second sensing line increases step by step.

5. The sensor of claim 4, wherein the second sensing line outside one side of the second sensing cell has a wider width than the first sensing line outside one side of the first sensing cell.

6. The sensor of claim 2, the plurality of sensing lines further includes:
   a third sensing line connected to the plurality of sensing electrodes of a third sensing cell among the plurality of sensing cells; and
   a fourth sensing line connected to the plurality of sensing electrodes of a fourth sensing cell among the plurality of sensing cells.

7. The sensor of claim 6, wherein the fourth sensing line is disposed closer to a second edge of the first substrate than the third sensing line, and a maximum width of the fourth sensing line is larger than a maximum width of the third sensing line.

8. The sensor of claim 6, wherein the fourth sensing line is longer than the third sensing line.

9. The sensor of claim 6, wherein a width of the fourth sensing line increases step by step.

10. The sensor of claim 6, wherein the fourth sensing line outside one side of the third sensing cell has a same width with the first sensing line outside one side of the first sensing cell.

11. The sensor of claim 10, wherein the second sensing line outside one side of the second sensing cell has a wider width than the first sensing line outside one side of the first sensing cell.

12. The sensor of claim 6, wherein the number of sensing lines disposed in a first edge of the first substrate among the plurality of sensing lines is smaller than the number of sensing lines disposed in a second edge of the first substrate among the plurality of sensing lines.

13. The sensor of claim 12, wherein the first sensing line and the second sensing line are disposed in the first edge of the first substrate, and wherein the third sensing line and the fourth sensing line are disposed in the second edge of the first substrate.

14. The sensor of claim 13, wherein the first sensing line has a first width larger than a third width of the third sensing line.

15. The sensor of claim 11, wherein the second sensing line outside one side of the second sensing cell has a second width larger than a fourth width of the fourth sensing line outside one side of fourth sensing cell.

16. The sensor of claim 1, further comprising:
a main protrusion that protrudes from a side surface of a driving electrode among the plurality of driving electrodes or a sensing electrode among the plurality of sensing electrodes;
a first protrusion protruding from a first side surface of the main protrusion;
a second protrusion protruding from a second side surface of the main protrusion; and
a third protrusion protruding from a third side surface, facing the second side surface, of the main protrusion.

17. The sensor of claim 16, wherein each of the first protrusion, the second protrusion, and the third protrusion has a size smaller than a size of the main protrusion.

18. The sensor of claim 1, further comprising:
a second substrate facing the first substrate; and
an adhesive layer configured to adhere the first substrate to the second substrate and at least partially overlap at least one of the plurality of driving lines and the plurality of sensing lines.

19. Me sensor of claim 18, wherein the plurality of sensing pads are not covered by the second substrate and the adhesive layer.

20. A sensor, comprising:
a first substrate;
a plurality of sensing cells disposed on a first surface of the first substrate;
a plurality of driving electrodes and a plurality of sensing electrodes respectively facing each other in each of the plurality of sensing cells; and
a plurality of sensing lines respectively connecting the plurality of sensing electrodes to a plurality of sensing pads,
wherein a maximum width of a first sensing line among the plurality of sensing lines is different from a maximum width of a second sensing line among the plurality of sensing lines,
wherein the first sensing line is connected to the plurality of sensing electrodes of a first sensing cell among the plurality of sensing cells, and wherein a second sensing line is connected to the plurality of sensing cells, and wherein a second sensing line is connected to the plurality of sensing electrodes of a second sensing cell among the plurality of sensing cells, and
wherein the second sensing line is disposed closer to a first edge of the first substrate than the first sensing line, and the maximum width of the second sensing line is larger than the maximum width of the first sensing line.

21. A sensor, comprising:
a first substrate;
a plurality of sensing cells disposed on a first surface of the first substrate;
a plurality of driving electrodes and a plurality of sensing electrodes respectively facing each other in each of the plurality of sensing cells; and
a plurality of sensing lines respectively connecting the plurality of sensing electrodes to a plurality of sensing pads,
wherein a maximum width of a first sensing line among the plurality of sensing lines is different from a maximum width of a second sensing line among the plurality of sensing lines,
wherein the first sensing line is connected to the plurality of sensing electrodes of a first sensing cell among the plurality of sensing cells, and wherein a second sensing line is connected to the plurality of sensing electrodes of a second sensing cell among the plurality of sensing cells, and
herein the second sensing line outside one side of the first sensing cell has a same width with the first sensing line outside one side of the first sensing cell.

* * * * *